US012778283B1

(12) United States Patent
Gagne et al.

(10) Patent No.: US 12,778,283 B1
(45) Date of Patent: Nov. 3, 2026

(54) MODULAR COMPARTMENT SYSTEM AND METHODS OF ACCESS

(71) Applicant: RecRe Inc., Harrisonburg, VA (US)

(72) Inventors: Quinn Gagne, Norfolk, VA (US); Page Wood, Snowshoe, WV (US); Griffin Harrington, Brooklyn, NY (US); Phil Saunders, Harrisonburg, VA (US); Zach Fearnside, Raleigh, NC (US); Nick Sipes, Sudbury, MA (US)

(73) Assignee: RecRe Inc., Harrisonburg, VA (US)

( * ) Notice: Subject to any disclaimer, the term of this patent is extended or adjusted under 35 U.S.C. 154(b) by 0 days.

(21) Appl. No.: 19/397,262

(22) Filed: Nov. 21, 2025

Related U.S. Application Data

(60) Provisional application No. 63/869,748, filed on Aug. 25, 2025.

(51) Int. Cl.

| | |
|---|---|
| ***A47B 57/20*** | (2006.01) |
| ***A47B 81/00*** | (2006.01) |
| ***G06Q 30/0645*** | (2023.01) |
| ***G07C 9/00*** | (2020.01) |

(52) U.S. Cl.
CPC .............. *A47B 57/20* (2013.01); *A47B 81/00* (2013.01); *G06Q 30/0645* (2013.01); *G07C 9/00309* (2013.01); *G07C 9/00896* (2013.01); *G07C 2009/00769* (2013.01)

(58) Field of Classification Search
CPC ....... A47B 57/20; A47B 81/00; A47B 96/066; G06Q 30/0645; G07C 9/00309; G07C 9/00896; G07C 2009/00769; A47G 29/141; A47G 29/1248; G07F 17/13
See application file for complete search history.

(56) References Cited

U.S. PATENT DOCUMENTS

| | | | | |
|---|---|---|---|---|
| 3,650,588 A * | 3/1972 | Helland | A47B 57/20 | 211/126.15 |
| 5,223,829 A * | 6/1993 | Watabe | A47G 29/141 | 340/568.1 |
| 5,774,053 A * | 6/1998 | Porter | A47G 29/141 | 340/568.1 |
| 6,323,782 B1 * | 11/2001 | Stephens | G07C 9/00571 | 340/5.73 |
| 6,715,682 B2 * | 4/2004 | Hara | G07F 17/10 | 235/462.14 |
| 6,756,879 B2 * | 6/2004 | Shuster | G07F 17/13 | 700/214 |
| 8,714,669 B1 * | 5/2014 | Clausen | A47B 49/004 | 312/297 |
| 9,223,315 B2 | 12/2015 | Irwin et al. | | |

(Continued)

*Primary Examiner* — William L Miller
(74) *Attorney, Agent, or Firm* — Neo IP

(57) ABSTRACT

A modular compartment system and related methods for locking and unlocking the modular compartment system. Storage compartments within the modular compartment system are reconfigurable and include remote, electronic unlocking capabilities. Reconfigurable control electronics enable customizable storage compartment size while retaining electronic, remote unlocking. A modular hub tower of the modular compartment system is able to securely connect to another modular hub tower and chain successive modular hub towers together to increase customizability of the modular compartment system.

6 Claims, 21 Drawing Sheets

(56) References Cited

U.S. PATENT DOCUMENTS

| | | | | |
|---|---|---|---|---|
| 9,504,344 | B2 | 11/2016 | Sarvestani | |
| 10,010,170 | B2 | 7/2018 | Ryner et al. | |
| 10,053,288 | B1 * | 8/2018 | Rawal | G06Q 10/0836 |
| 10,624,484 | B1 * | 4/2020 | Mountford | B60P 3/03 |
| 10,888,189 | B2 * | 1/2021 | Pointeau | G06Q 10/08 |
| 10,915,856 | B2 * | 2/2021 | Fee | G06Q 10/087 |
| 10,968,681 | B2 | 4/2021 | Schmider et al. | |
| 11,017,348 | B1 | 5/2021 | Brooks et al. | |
| 11,270,251 | B2 * | 3/2022 | Fee | G06Q 10/087 |
| 11,410,118 | B2 * | 8/2022 | Fee | G07C 9/00896 |
| 11,690,924 | B1 | 7/2023 | Gokcebay et al. | |
| 12,239,226 | B2 * | 3/2025 | Giovannetti | A47B 96/066 |
| 12,303,050 | B2 | 5/2025 | Jakubowski et al. | |
| 12,324,534 | B2 * | 6/2025 | Musaed | G06Q 10/0836 |
| 12,364,334 | B2 * | 7/2025 | Cattaneo | A47B 96/066 |
| 12,433,405 | B2 * | 10/2025 | Giovannetti | F16B 12/24 |
| 12,478,182 | B2 * | 11/2025 | Giovannetti | F16B 12/32 |
| 12,543,879 | B2 * | 2/2026 | Jordan | A47G 29/141 |
| 12,543,880 | B2 * | 2/2026 | Tatsumoto | A47G 29/141 |
| 12,553,460 | B2 * | 2/2026 | Cattaneo | F16B 12/24 |
| 2004/0074957 | A1 * | 4/2004 | Devar | G07F 17/13<br>232/17 |
| 2012/0326840 | A1 * | 12/2012 | Frankenberg | G07F 17/13<br>340/5.65 |
| 2013/0264381 | A1 * | 10/2013 | Kim | G07F 17/13<br>232/24 |
| 2014/0330603 | A1 | 11/2014 | Corder et al. | |
| 2015/0254760 | A1 * | 9/2015 | Pepper | G07F 17/12<br>705/5 |
| 2015/0371187 | A1 * | 12/2015 | Irwin | G06Q 10/0836<br>705/72 |
| 2016/0066732 | A1 * | 3/2016 | Sarvestani | A47G 29/141<br>232/24 |
| 2016/0235236 | A1 * | 8/2016 | Byers | A47G 29/14 |
| 2017/0215580 | A1 * | 8/2017 | Pitts | A47G 29/141 |
| 2017/0286905 | A1 * | 10/2017 | Richardson | G06Q 10/0836 |
| 2018/0070753 | A1 * | 3/2018 | Eveloff | H04W 4/025 |
| 2018/0091503 | A1 | 3/2018 | Tang | |
| 2019/0231105 | A1 * | 8/2019 | Pointeau | G07C 9/00896 |
| 2019/0344965 | A1 | 11/2019 | Wilkinson et al. | |
| 2019/0362579 | A1 * | 11/2019 | Phillips | F25D 29/006 |
| 2019/0370744 | A1 * | 12/2019 | Fee | G07G 1/0063 |
| 2022/0036676 | A1 * | 2/2022 | Cartwright | G05B 19/042 |
| 2022/0051514 | A1 * | 2/2022 | Schmidt | G06V 20/00 |
| 2022/0061571 | A1 * | 3/2022 | Milenkovic | G07C 9/00571 |
| 2022/0338630 | A1 * | 10/2022 | Cattaneo | F16B 12/24 |
| 2023/0200578 | A1 * | 6/2023 | Chhina | A47G 29/1251<br>232/24 |
| 2023/0248147 | A1 * | 8/2023 | Giovannetti | F16B 12/2027<br>248/205.1 |
| 2023/0380595 | A1 * | 11/2023 | Cattaneo | A47B 96/066 |
| 2023/0404262 | A1 * | 12/2023 | Cattaneo | A47B 96/066 |
| 2024/0065465 | A1 * | 2/2024 | Vardaro | A47G 29/141 |
| 2024/0074581 | A1 * | 3/2024 | Giovannetti | F16B 12/10 |
| 2024/0108133 | A1 * | 4/2024 | Chang | A47B 87/0292 |
| 2024/0144753 | A1 | 5/2024 | O'Rourke et al. | |
| 2024/0260755 | A1 * | 8/2024 | Giovannetti | A47B 96/066 |
| 2024/0268590 | A1 * | 8/2024 | Musaed | A47G 29/141 |
| 2024/0341514 | A1 * | 10/2024 | Carels | A47G 29/14 |
| 2024/0346574 | A1 * | 10/2024 | Ishida | G07F 17/14 |
| 2024/0349888 | A1 * | 10/2024 | Liu | A47B 88/417 |
| 2024/0371221 | A1 * | 11/2024 | Hollman | G07C 9/00309 |
| 2024/0425278 | A1 * | 12/2024 | Tsubakimoto | A47G 29/141 |
| 2025/0148857 | A1 * | 5/2025 | Ecton | G06Q 30/0633 |
| 2025/0185806 | A1 * | 6/2025 | Cattaneo | A47B 96/068 |
| 2025/0188971 | A1 * | 6/2025 | Cattaneo | F16B 12/2027 |
| 2025/0252806 | A1 * | 8/2025 | Pointeau | G07F 17/13 |
| 2025/0302223 | A1 * | 10/2025 | Ciliberti | A47G 29/30 |
| 2025/0363844 | A1 * | 11/2025 | Chang | G07C 9/00309 |

* cited by examiner

FIG. 10B
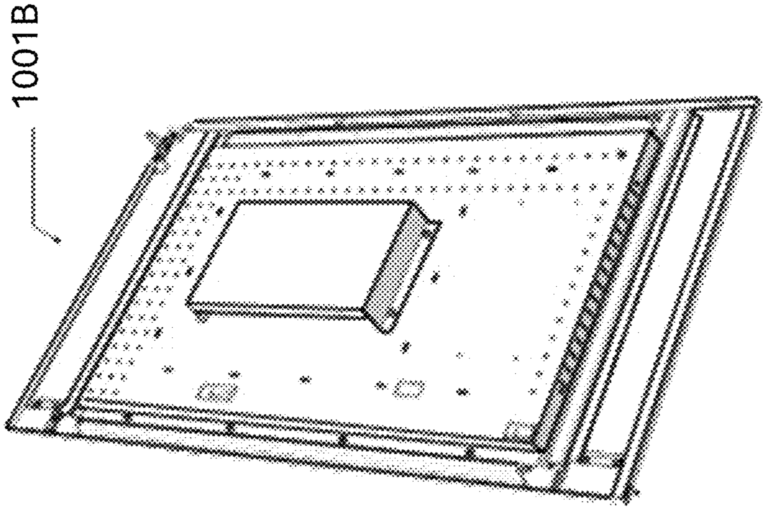
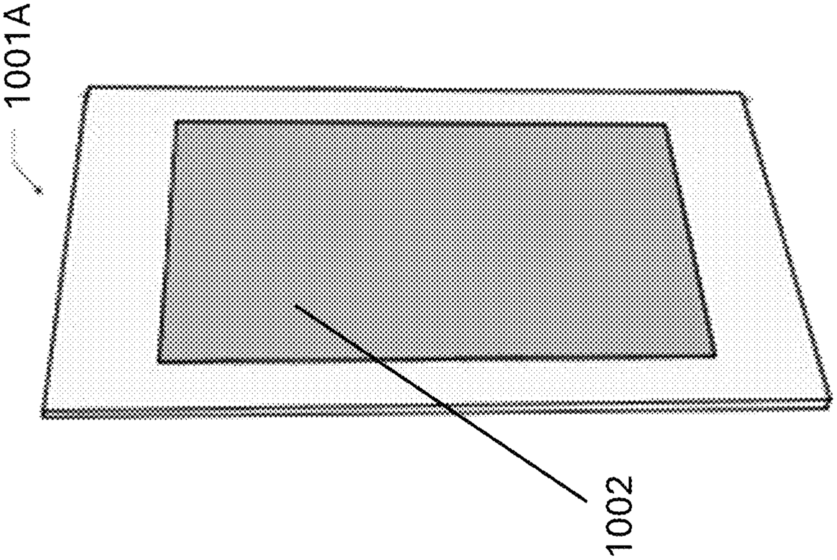
FIG. 10A

MODULAR COMPARTMENT SYSTEM AND METHODS OF ACCESS

CROSS REFERENCES TO RELATED APPLICATIONS

This application claims the benefit of and priority to U.S. Provisional Patent Application No. 63/869,748, filed Aug. 25, 2025, which is incorporated herein by reference in its entirety.

BACKGROUND OF THE INVENTION

1. Field of the Invention

The present invention relates to a modular compartment system and methods of accessing the modular compartment system. More specifically, the present invention relates to a modular compartment system that is operable to be reconfigured post-deployment and is unlocked remotely.

2. Description of the Prior Art

It is generally known in the prior art to provide storage systems.

Prior art patent documents include the following:

US Patent Pub. No. 2014/0330603 for an intelligent reconfigurable locker system by inventors Thomas Corder et al., filed May 1, 2014, and published Nov. 6, 2014, is directed to the configuration of locker sizes during installation that can be reconfigured periodically to conform to the packages that arrive at the locker location. Locker control software can enable the efficient selection of locker size so that the locker bank can be optimized to the size of the packages that are delivered to the locker location. The reconfigurable lockers also may include a modular locker control module that can assist in the easy facilitation of changing the locker size. Also, the locker software can be flexible enough so that customers can have a direct communication link to the locker software that would allow the customer's mobile device to input authentication and access codes that would open up locker door(s). The locker software could also be enabled on the cloud providing an e-commerce goods seller, shipper or locker operator with information about goods that are shipped to locker locations and when customers stop by to pick up their goods or to return their goods to the e-commerce seller.

U.S. Pat. No. 9,504,344 for an automated article delivery and collecting machine by inventor Seyed Amin Ghorashi Sarvestani, filed Sep. 10, 2014, and issued Nov. 29, 2016, is directed to a storage unit for depositing articles for subsequent retrieval. The storage unit includes a plurality of storage compartments with at least one retractable and foldable shelf member within each storage compartment. The storage unit also includes a set of doors configured to cooperate with each other and movable between a closed configuration which disallows access to the plurality of storage compartments and an opened configuration which allows access to the plurality of storage compartments. A control system which includes a computer, a processor board and software is also included with the storage unit. The control system may receive and process an input allowing the set of doors to be moved to an open configuration and may selectively define an access opening between the set of doors for accessing a storage section selected from at least one of the storage compartments.

U.S. Pat. No. 9,223,315 for a method of controlling item delivery to an electronic parcel locker by inventors Donald E. Irwin et al., filed Dec. 5, 2012, and issued Dec. 29, 2015, is directed to a system, apparatus, and method for use in delivery of items to a storage unit. The storage unit can include one or several storage receptacles and a control unit that controls and monitors the status of the one or several storage receptacles. The storage unit can be included in a storage unit system that can include one or several storage units and a central control unit. The central control unit can communicate with the one or several storage units, and can receive status and availability updates from the one or several storage units.

U.S. Pat. No. 11,017,348 for an on demand locker system and related methods for delivering a package by inventors Jason Lee Brooks et al., filed Oct. 7, 2019, and issued May 25, 2021, is directed to methods and systems for delivering a package to a customer employing an on-demand locker assembly having a plurality of lockers. A computer-implemented method of staging delivery of a package to a customer includes displaying a network link that is selectable by the customer on an electronic client device. In response to selection of the network link, the package is transferred to one of the lockers. An access code for the locker is sent to the electronic client device. Upon entry of the access code, the locker is opened to provide the customer with access to the package to retrieve the package from the locker.

US Patent Pub. No. 2024/0144753 for a locker system by inventors David O'Rourke et al., filed Sep. 28, 2023, and published May 2, 2024, is directed to a contactless delivery locker having a locker housing with a locker door fitted to the locker housing. A disinfecting system may be arranged to disinfect the locker content and a remotely actuable lock may be arranged to secure the locker door in a closed position and actuable to release the locker door. A controller associated with the lock may be configured to actuate the lock and a wireless interface may be connected to the controller and configured to receive a command to actuate the lock to release the locker door. The controller may operate to control actuation of the lock to release the locker door upon detection of a command to actuate the lock and release the locker door. The controller may be configured to report lock status information to a user to confirm if a locker has been opened after completion of a disinfecting cycle.

U.S. Pat. No. 12,303,050 for a to-go cubby unit by inventors James Jakubowski et al., filed Mar. 11, 2024, and issued May 20, 2025, is directed to a cubby unit including a plurality of cubbies and one or more processing circuits. Each of the plurality of cubbies includes a cubby housing defining an internal compartment, a light disposed within the internal compartment, and a door. The door facilitates accessing the internal compartment of the cubby housing. At least a portion of the door is transparent. The one or more processing circuits are configured to acquire access information, determine whether the access information is associated with a respective order within a respective cubby of the plurality of cubbies, and activate the light of the respective cubby in response to the access information being associated with the respective order such that light emitted by the light shines through the portion of the door that is transparent of the respective cubby to indicate in which one of the plurality of cubbies the respective order is located.

U.S. Pat. No. 10,968,681 for a smart locker system by inventors John Paul Schmider et al., filed Sep. 10, 2020, and issued Apr. 6, 2021, is directed to a smart locker system including an enclosure unit and a cassette unit. The smart locker is extendable by adding additional enclosure units and the cassette units. The cassette unit includes storage bins and a control bin. The cassette unit contains different size of storage bins and a control bin. The smart locker system further includes a touch screen and authentication devices. The smart locker system can arrange the storage bins and the control bins to maintain the height of the smart locker system.

US Patent Pub. No. 2019/0344965 for systems and methods for automated storage and retrieval by inventors Bruce W. Wilkinson et al., filed May 14, 2019, and published Nov. 14, 2019, is directed to a system, method and computer-readable medium for providing items for purchase at an automated storage and retrieval system in a facility. Example embodiments include a storage tower configured to store and dispense items, where the storage tower includes storage receptacles, shelves, a receiving opening, a delivery opening, sensors, a user interface, and a transport apparatus for transporting storage receptacles from the shelves to the delivery opening. A computing device, in communication with the sensors and transport apparatus is configured to execute a purchase module to determine items as possible purchase items and transmit instructions to pick the items and place them in a storage receptacle. The storage receptacle is presented to a user via the delivery opening, and the purchase module detects a user removing at least one item from the storage receptacle and identifies the removed item using data sensed by the sensors.

US Patent Pub. No. 2018/0091503 for a networked storage system and method by inventor Ben Wu Tang, filed Sep. 27, 2016, and published Mar. 29, 2018, is directed to a networked storage system and method providing multiple lockers arranged in a modular configuration, and multiple security means for accessing and monitoring lockers through an interconnected network of processors, user identifiers, and detectors that alert to unauthorized access to the lockers. The lockers are networked with a central kiosk and a remote processor for a user to access the lockers, for storing locker information, for monitoring lockers, and for processing events at lockers. The remote processor stores locker information, identifying characteristics of the user, a barcode, and a rewritable locker access code. Each locker has a door lock that retains a door in a locked position, and is releasable to an unlocked position upon: authentication of the identifying characteristic of user, scanning of barcode, and entry of rewritable locker access code. Each locker has a motion detection apparatus for detecting and alerting to unauthorized manipulation of items in the lockers.

U.S. Pat. No. 11,690,924 for a locker system for storage and delivery of packages by inventors Asil Gokcebay et al., filed May 20, 2020, and issued Jul. 4, 2023, is directed to a modular system of locker banks for receipt and delivery of packages. The system may include associate modules each having one or more lockers and a control board in communication with each of the lockers in the module. Each locker may include a locker board having a processor and memory configured to control operation of the locker. Each locker may include a lock and a light. The system may further include one or more control modules, each having the above components and further including a kiosk having one or more input and output devices for entering information to the module for controlling operation of the system. The modular system may be connected to a server and/or an administrator terminal.

US Patent Pub. No. 2024/0065465 for a modular automated locker and method of making same by inventor Enzo Vardaro, filed Aug. 29, 2023, and published Feb. 29, 2024, is directed to a modular locker comprising at least two vertical towers being positioned side by side. Each vertical tower defines a front opening and a space therein and comprises spaced apart lateral walls interconnected by top, bottom, and rear parts. The lateral walls define respective inner and outer sides. The outer side comprises a protruding contour surrounding a recessed surface. The interfacing lateral walls of adjacent vertical towers are releasably connected defining an enclosure therebetween. A plurality of compartments for containing parcels therein are vertically arranged within each of the towers. Each of the compartments comprises a shelf structure comprising a shelf floor and a door. The shelf floor is mounted to the inner sides of the spaced apart lateral walls. The door is mounted to the tower at the front opening and is movable between open and closed positions thereby providing for selectively accessing the compartment.

U.S. Pat. No. 10,010,170 for a modular storage system by inventors Leo Ryner et al., filed Sep. 10, 2015, and issued Jul. 3, 2018, is directed to a modular storage system, comprising a plurality of box-shaped structural units, one or more of which are storage units used for storage, and each structural unit having front and back faces and left, right, top and bottom sides, wherein: the box-shaped structural units are laterally attachable to each other side-by-side through attachment points on the left and right sides, thereby to construct a joined structure of at least two of the structural units; and one or more of the box-shaped structural units are reversible structural units, in which the corresponding attachment points are positioned and shaped so that the reversible structural unit is attachable in the lateral side-by-side attachment so that the corresponding front faces of adjacent joined structural units are oriented either in one direction or in opposite directions.

SUMMARY OF THE INVENTION

The present invention relates to a modular compartment system and methods of unlocking the modular compartment system.

It is an object of this invention to provide a reconfigurable modular compartment system that is remotely unlocked.

In one embodiment, the present invention is directed to provide a modular compartment system, including a hub tower including control electronics, at least one floor panel including at least one engagement element, at least one door panel, and at least one electronic locking mechanism, wherein the hub tower includes at least one receiving element operable to receive the at least one engagement element of the at least one floor panel, securing the at least one floor panel to the hub tower, wherein the at least one floor panel secured to the hub tower creates a compartment, wherein the at least one door panel is operable to engage the at least one floor panel and/or the hub tower via a pivotal engagement, wherein the at least one door panel is operable to engage the at least one electronic locking mechanism when the at least one electronic locking mechanism is in a locked position and disengage the at least one electronic locking mechanism when the at least one electronic locking mechanism is in an unlocked position, and wherein a size of the compartment is adjustable via repositioning the at least one floor panel within the hub tower.

In another embodiment, the present invention is directed to a method of reconfiguring a modular hub tower, including providing at least one floor panel and at least one door panel, retracting an engagement element of the at least one floor panel, inserting the at least one floor panel into an interior chamber of the modular hub tower, protracting the engagement element into a receiving element of the modular hub tower, securing the at least one floor panel to the modular hub tower, and creating a compartment, retracting a pin of the at least one door panel, inserting the at least one door panel into the modular hub tower, protracting the pin of the at least one door panel into a depression on the at least one floor panel and/or the modular hub tower, engaging, by the at least one door panel, an electronic locking mechanism attached to the at least one floor panel or the modular hub tower, the at least one door panel disengaging the electronic locking mechanism via control electronics unlocking the electronic locking mechanism within the modular hub tower, and reconfiguring a size of the compartment via repositioning the at least one floor panel within the hub tower.

In yet another embodiment, the present invention is directed to a modular compartment system, including a hub tower including control electronics, a plurality of floor panels each including at least one engagement element, a plurality of door panels, and a plurality of locking mechanisms, wherein the hub tower includes a plurality of receiving elements, each of the plurality of receiving elements operable to receive the at least one engagement element, securing the plurality of floor panels to the hub tower, wherein securing the plurality of floor panels to the hub tower creates a plurality of compartments, wherein the plurality of door panels are operable to engage the plurality of floor panels and/or the hub tower via a pivotal engagement, wherein the plurality of door panels are operable to engage the plurality of electronic locking mechanisms when the plurality of electronic locking mechanisms are in a locked position and disengage the plurality of electronic locking mechanisms when the plurality of electronic mechanisms are in an unlocked position, and wherein sizes of the plurality of compartments are adjustable via repositioning the plurality of floor panels within the hub tower.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 10A illustrates a front perspective view of a door panel with an electronic display according to one embodiment of the present invention.

FIG. 10B illustrates a back perspective view of electronics for a door panel with an electronic display according to one embodiment of the present invention.

DETAILED DESCRIPTION

Figure 1:
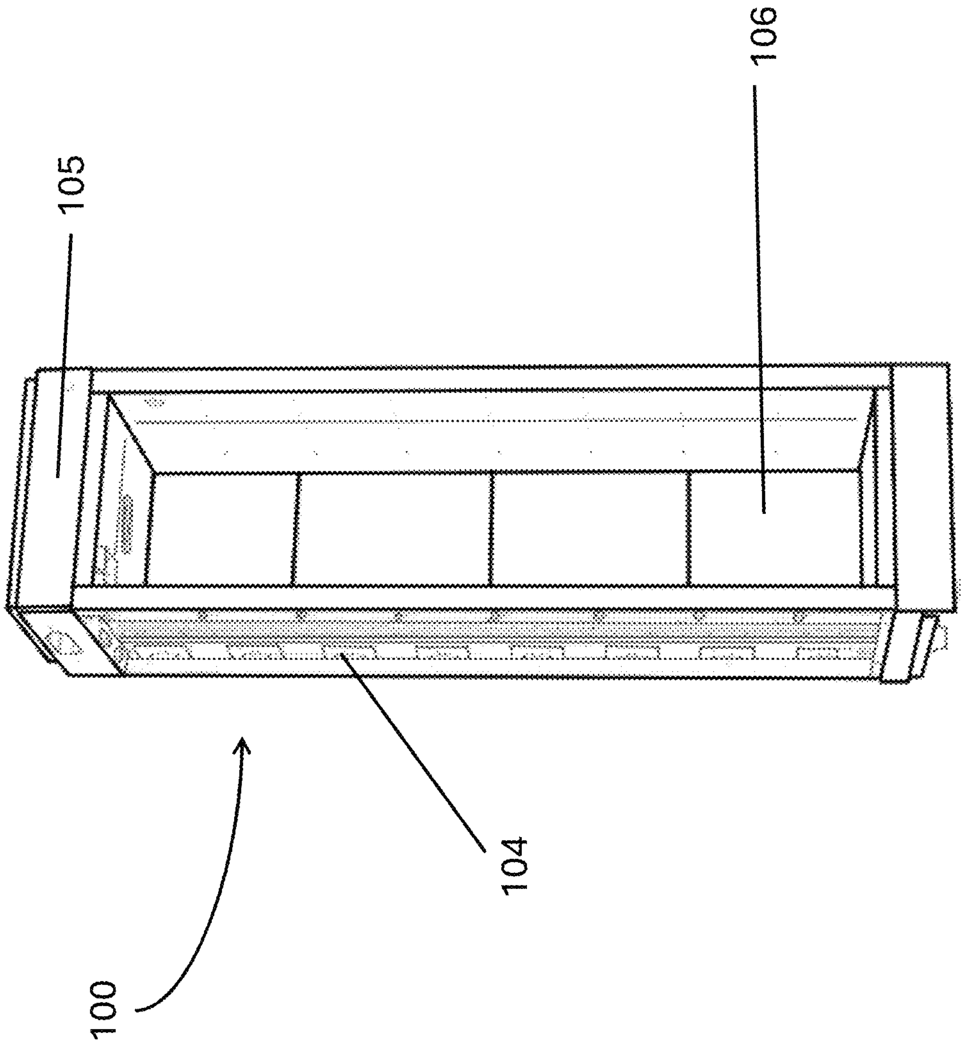
FIG. 1 illustrates a perspective view of an unconfigured modular compartment system according to one embodiment of the present invention.

The present invention is generally directed to remotely accessible modular compartment systems.

In one embodiment, the present invention is directed to provide a modular compartment system, including a hub tower including control electronics, at least one floor panel including at least one engagement element, at least one door panel, and at least one electronic locking mechanism, wherein the hub tower includes at least one receiving element operable to receive the at least one engagement element of the at least one floor panel, securing the at least one floor panel to the hub tower, wherein the at least one floor panel secured to the hub tower creates a compartment, wherein the at least one door panel is operable to engage the at least one floor panel and/or the hub tower via a pivotal engagement, wherein the at least one door panel is operable to engage the at least one electronic locking mechanism when the at least one electronic locking mechanism is in a locked position and disengage the at least one electronic locking mechanism when the at least one electronic locking mechanism is in an unlocked position, and wherein a size of the compartment is adjustable via repositioning the at least one floor panel within the hub tower.

In another embodiment, the present invention is directed to a method of reconfiguring a modular hub tower, including providing at least one floor panel and at least one door panel, retracting an engagement element of the at least one floor panel, inserting the at least one floor panel into an interior chamber of the modular hub tower, protracting the engagement element into a receiving element of the modular hub tower, securing the at least one floor panel to the modular hub tower, and creating a compartment, retracting a pin of the at least one door panel, inserting the at least one door panel into the modular hub tower, protracting the pin of the at least one door panel into a depression on the at least one floor panel and/or the modular hub tower, engaging, by the at least one door panel, an electronic locking mechanism attached to the at least one floor panel or the modular hub tower, the at least one door panel disengaging the electronic locking mechanism via control electronics unlocking the electronic locking mechanism within the modular hub tower, and reconfiguring a size of the compartment via repositioning the at least one floor panel within the hub tower.

In yet another embodiment, the present invention is directed to a modular compartment system, including a hub tower including control electronics, a plurality of floor panels each including at least one engagement element, a plurality of door panels, and a plurality of locking mechanisms, wherein the hub tower includes a plurality of receiving elements, each of the plurality of receiving elements operable to receive the at least one engagement element, securing the plurality of floor panels to the hub tower, wherein securing the plurality of floor panels to the hub tower creates a plurality of compartments, wherein the plurality of door panels are operable to engage the plurality of floor panels and/or the hub tower via a pivotal engagement, wherein the plurality of door panels are operable to engage the plurality of electronic locking mechanisms when the plurality of electronic locking mechanisms are in a locked position and disengage the plurality of electronic locking mechanisms when the plurality of electronic mechanisms are in an unlocked position, and wherein sizes of the plurality of compartments are adjustable via repositioning the plurality of floor panels within the hub tower.

None of the prior art discloses a modular compartment system operable to be reconfigured after assembly. Problematically, prior art systems, as disclosed in U.S. Pat. No. 11,690,924, disclose a storage system with predetermined compartment sizes. Predetermined compartment sizes limit what objects are able to fit in the compartment. For example, a prior art system that is assembled with 10 small storage compartments will always have 10 small storage compartments. If a user desires to store a large item, the prior art systems are unable to adapt the size of the storage compartment to accommodate the large item. To illustrate further, the prior art systems are incapable of housing many smaller items and then being reconfigured to house larger items, limiting the use of a prior art storage system. Therefore, there exists an unmet need for a modular compartment system operable to be reconfigured after the modular compartment system is assembled.

Prior art systems, such as U.S. Pat. No. 10,010,170, attempt to solve the problem of reconfigurability of a compartment system. U.S. Pat. No. 10,010,170 uses predefined storage compartments, defined as "box-shaped structural units." Each of the block-shaped structural units are operable to attach to one another, similar to stacking boxes on each other. Because each box-shaped structural unit is separate and removable, the connection between each unit is mechanical, without any electrical connection between the units. The predefined unit size and failure to provide electrical connectivity are problematic for at least two reasons. First, the prior art system fails to account for electronic remote access of a compartment of the modular compartment system, and second, the prior art system fails to provide customizable compartment sizes. First, box-shaped units in U.S. Pat. No. 10,010,170 fail to electrically connect each compartment in the compartment system such that each compartment cannot be unlocked remotely. Second, the size of the box-shaped units in U.S. Pat. No. 10,010,170 are not customizable. Therefore, there exists an unmet need for a modular compartment system operable to be reconfigured with electronic locking and unlocking.

In another case, prior art systems, such as U.S. Patent Pub. No. 2024/0065465, attempt to provide a reconfigurable storage system with customizable compartment sizes. However, U.S. Patent Pub. No. 2024/0065465 requires each compartment to be assembled using a door panel, a pair of lateral wall panels, and a floor panel. Problematically, each compartment requires a drawer-like assembly each time a compartment needs to be reconfigured, which is time-consuming and requires side panels for each size compartment. Also, the size of the compartments are limited to the predetermined size of the side panels. Therefore, there exists an unmet need for a reconfigurable modular compartment system that does not require additional side panels so that each compartment size is fully customizable.

Further, prior art systems require a plurality of tools (i.e., screwdriver, hammer, wrench, etc.) to remove and reattach components. As such, prior art systems require manual labor and additional tools to reconfigure the prior art system. Therefore, there exists an unmet need for a modular compartment system operable to be reconfigured without additional tools.

The prior art systems also fail to link lighting into interaction logic. During a rental, pickup, return, etc. experience, prior art systems fail to provide visual indications of a stage of the experience. For example, if a user is returning an item to a prior art storage system and fails to close a door of the storage system, the prior art system fails to visually notify the user. In this case, failure to close the door may lead to theft. Therefore, prior art systems fail to provide visual notification of a stage of a rental, pickup, return, etc. experience.

None of the prior art teaches a modular compartment system operable to be reconfigured to adjust storage compartments without compromising electrical connectivity of each storage compartment, which enables remote unlocking for all size storage compartments.

Advantageously, the modular compartment system of the present invention is operable to be reconfigured such that each compartment size is customizable. Each compartment is operable to be as large as the modular compartment system or smaller. The modular compartment system is operable to be reconfigured without compromising electronic connections for components for each compartment to enable remote unlocking.

The modular compartment system of the present invention includes a loading zone operable to house at least one floor panel defining a storage compartment, at least one door panel, and a vertical electronics channel operable to electronically connect the at least one floor panel to an electronic housing portion to enable remote unlocking. In one embodiment, the modular compartment system is operable to include a single modular hub tower. In one embodiment, the modular compartment system is operable to include at least two modular hub towers connected to one another.

FIG. 1 illustrates a perspective view of an unconfigured modular compartment system 100 according to one embodiment of the present invention. The modular compartment system 100 includes a loading zone 106 operable to house at least one floor panel. The loading zone 106 includes an interior space, wherein the compartments are installed within the interior space. When the at least one floor panel is housed within the loading zone 106, the at least one floor panel and the loading zone 106 are operable to define at least one storage compartment. The modular compartment system 100 includes an electronic housing portion 105 operable to connect to an external power source (i.e., wall outlet, battery, solar panel, etc.) to provide power to the at least one floor panel via an electronics channel 104. The at least one floor panel includes an electronic lock such that the at least one floor panel is operable to remotely lock and unlock a door panel to access the at least one storage compartment. In one embodiment, the loading zone 106 is operable to be empty such that no floor panels are housed in the loading zone 106, partially full such that at least one floor panel is housed within the loading zone 106, defining at least one storage compartment below the at least one floor panel but an open space above the at least one floor panel, or the loading zone 106 is full such that the entire loading zone 106 is filled and occupied by the at least one storage compartment. In a preferred embodiment, the electronics channel 104 is covered by a side panel to prevent tampering.

Figure 2:
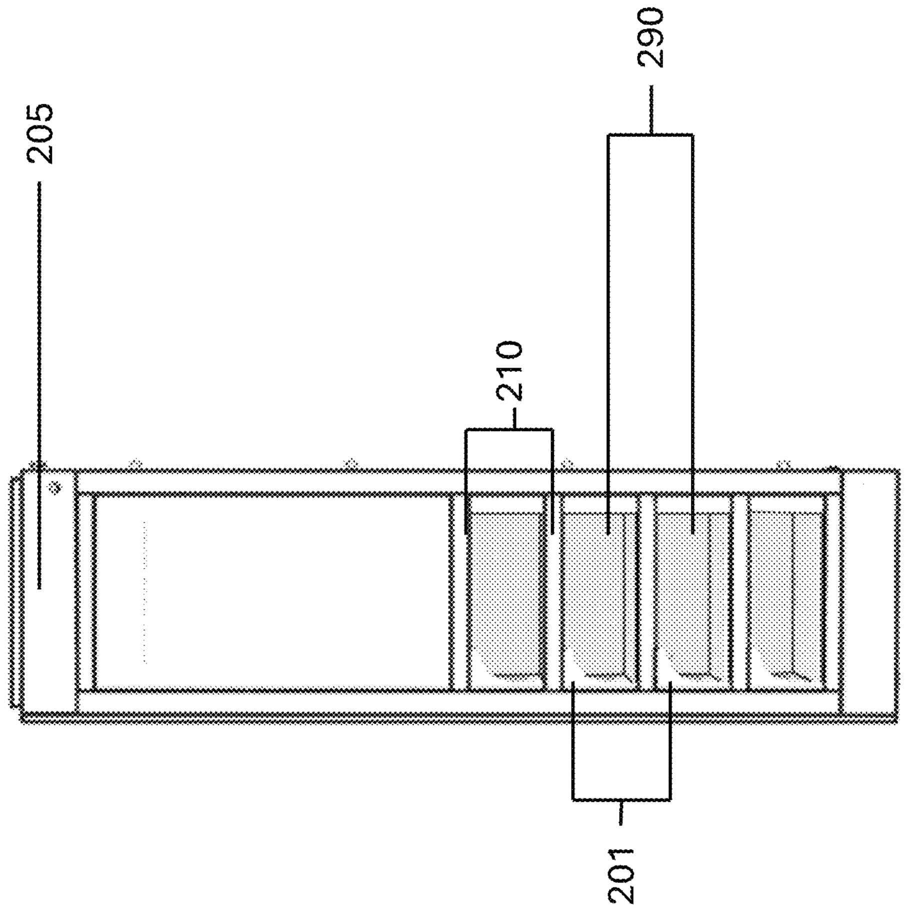
FIG. 2 illustrates a front view of a modular compartment system according to one embodiment of the present invention.

FIG. 2 illustrates a front view of a modular compartment system 200 according to one embodiment of the present invention. The modular compartment system 200 includes an electronic housing portion 205 electrically connected to at least one floor panel 210. The at least one floor panel 210, in combination with sidewalls of a loading zone of the modular compartment system 200, defines at least one storage compartment 290. Advantageously, the at least one storage compartment 290 does not require additional side panels to create the at least one storage compartment 290 because the sidewalls of the loading zone eliminate the need for additional side panels. Further, at least one storage compartment 290 is accessible via an electronically lockable door panel 201. Notably, the at least one storage compartment 290 is operable to vary in size depending on the positioning of the at least one floor panel 210 in the loading zone of the modular compartment system 200.

Figure 3B:
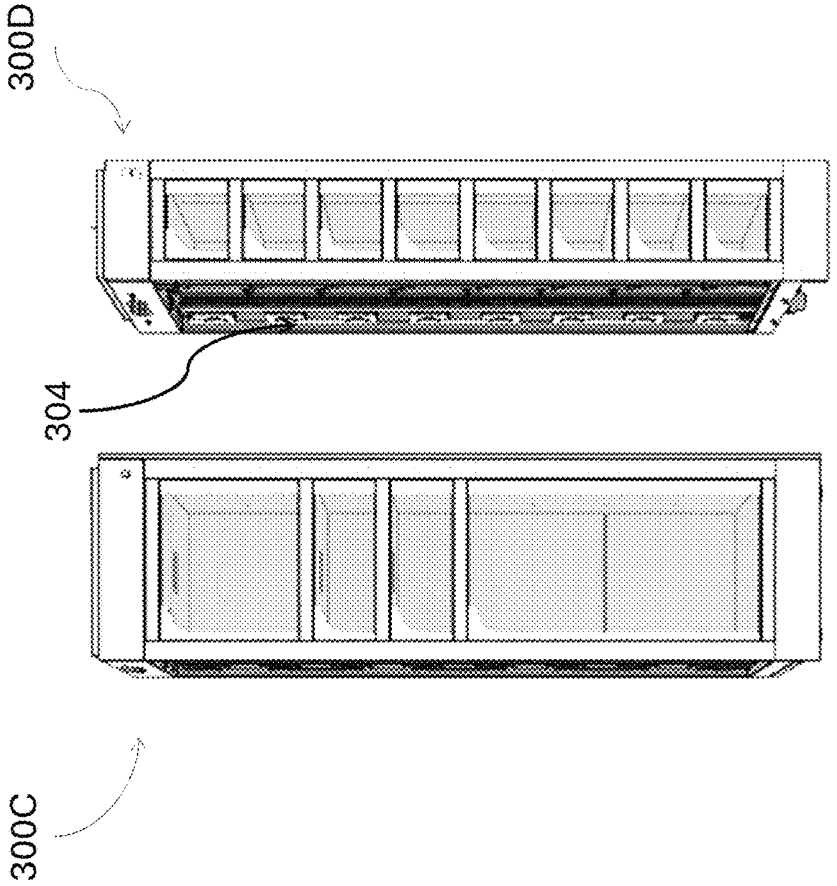
FIG. 3B illustrates a perspective view of a connectable modular compartment system according to one embodiment of the present invention.
Figure 3A:
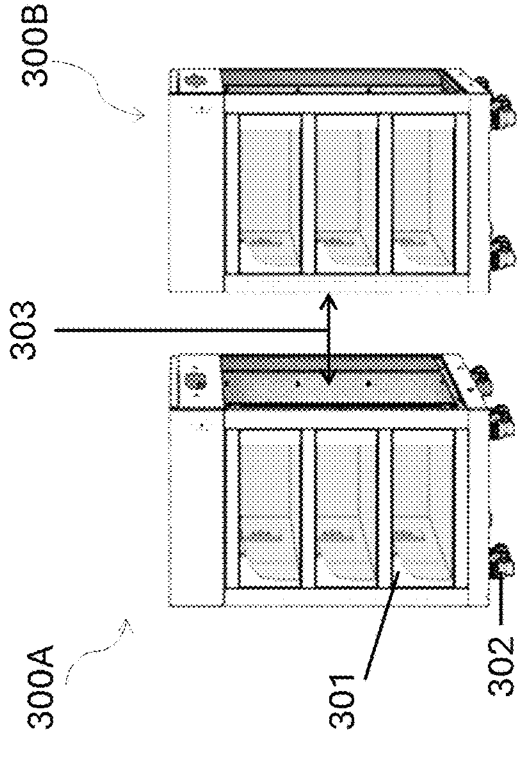
FIG. 3A illustrates a perspective view of a connectable modular compartment system according to one embodiment of the present invention.

FIG. 3A illustrates a perspective view of a connectable modular compartment system of varying sizes according to one embodiment of the present invention. In one embodiment, the modular compartment system comprises a single modular hub tower (300A or 300B). In another embodiment, the modular compartment system includes connecting at least two modular hub towers, for example, a connectable modular compartment system 300A connected to a connectable modular compartment system 300B. FIG. 3A illustrates a connectable modular compartment system (300A and 300B) according to one embodiment of the present invention. In one embodiment, the connectable modular compartment system 300A is operable to connect to another connectable modular compartment system 300B. Each of the connectable modular compartment systems 300A and 300B includes lockable wheel components 302 to move the connectable modular compartment systems 300A and 300B when the wheel components 302 are unlocked and prevent the modular compartment systems 300A and 300B from moving when the wheel components 302 are locked. Further, each of the connectable modular compartment systems 300A and 300B, includes electronically unlockable door panels 301. The connectable modular compartment system 300A attaches to the connectable modular compartment system 300B via a side-by-side connection 303. In one embodiment, each of the connectable modular compartment systems 300A and 300B includes a plurality of hook elements and a plurality of receiving elements. For example, the plurality of receiving elements associated with the connectable modular compartment system 300A are operable to receive the plurality of hook elements associated with the connectable modular compartment system 300B such that the connectable modular compartment system 300B attaches to the connectable modular compartment system 300A, and vice versa.

FIG. 3B illustrates a perspective view of a connectable modular compartment system (300C and 300D) according to one embodiment of the present invention. The connectable modular compartment system 300C is operable to connect to a connectable modular compartment system 300D of a different width such that the storage compartments of the connectable modular compartment system 300C are of a different width than the storage compartment of the connectable modular compartment system 300D. Notably, in one embodiment, a plurality of matingly attachable elements (displayed as 452 in FIG. 4A) on the connectable modular compartment system 300D are operable to receive a plurality of corresponding matingly attachable elements on the connectable modular compartment system 300C to connect the connectable modular compartment systems 300C and 300D. In one embodiment, a base portion and top portion of the connectable modular compartment system 300C include a mounting portion and receiving portion to connect to corresponding mounting portions and receiving portions on a base portion and top portion of the connectable modular compartment system 300D to connect the modular compartment systems 300C and 300D in a side-by-side configuration. Further, the electronic channel 304 is operable to provide power to both connectable modular compartment systems 300C and 300D. Generally, the connectable modular compartment systems 300C and 300D include a side panel to cover the electronic channel 304 when the connectable modular compartment systems 300C and 300D are not attached to another modular compartment system.

Figure 4A:
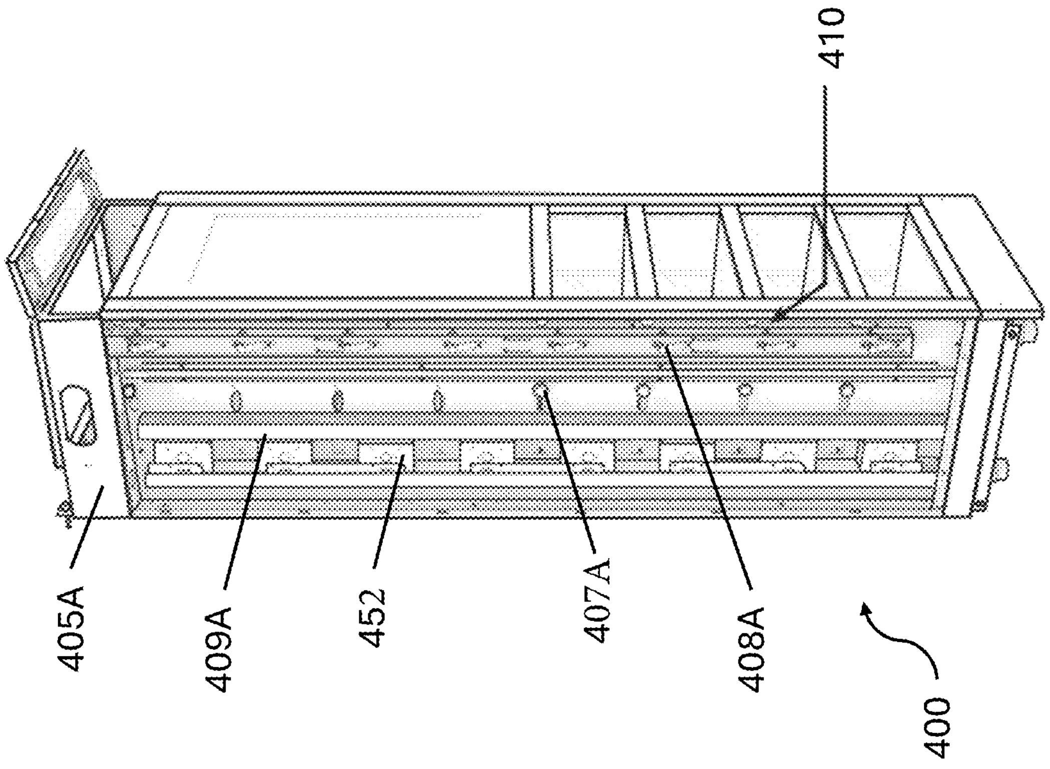
FIG. 4A illustrates a perspective view of a modular compartment system according to one embodiment of the present invention.

FIG. 4A illustrates a perspective view of a modular compartment system 400 according to one embodiment of the present invention. The modular compartment system 400 includes an electronics housing 405A operable to provide electricity to at least one floor panel via an electronics channel 409A. Each of the at least one floor panels are operable to be affixed to the modular compartment system via a fastener 407A. In one embodiment, the at least one floor panel includes a threaded rod that extends through an aperture of the modular compartment system 400 such that the fastener 407A twists along the threaded rod to secure the at least one floor panel to the modular compartment system 400. A vertical manual door panel opening mechanism 410 extends the length of the modular compartment system 400, which optionally includes at least one manual unlock lever 408A.

When the at least one floor panel is affixed to the modular compartment system 400, the modular compartment system 400 is operable to include the at least one manual unlock lever 408A. The at least one manual unlock lever 408A is operable to receive external pressure to unlock an electronic lock on a door panel. When the at least one floor panel is not affixed to the modular compartment system 400, the modular compartment system 400 is configured to not include a manual unlock lever. However, the modular compartment system 400 includes a plurality of pins 449 traversing an aperture operable to receive at least one manual unlock lever such that the at least one floor panel is operable to be positioned in a plurality of locations within the modular compartment system 400 and still enable manual unlocking. Put simply, the plurality of pins 449 receive a manual unlocking lever and are only visible when a manual unlocking lever is not attached.

Figure 4C:
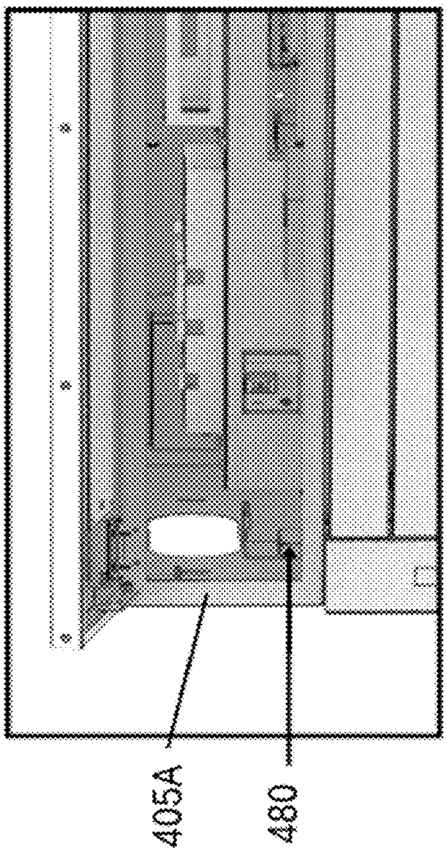
FIG. 4C illustrates an enlarged view of a housing for internal electronics of a modular compartment system according to one embodiment of the present invention.
Figure 4B:
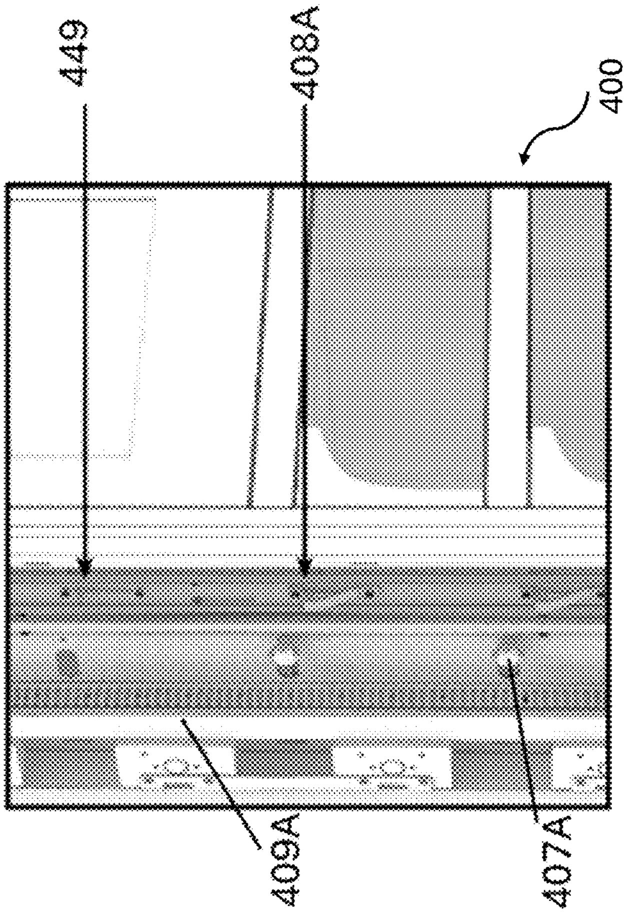
FIG. 4B illustrates an enlarged view of floor panel connectivity of a modular compartment system according to one embodiment of the present invention.

FIG. 4B illustrates an enlarged view of an internal view of floor panel connectivity to a modular compartment system according to one embodiment of the present invention. The modular compartment system includes a fastener 407A for the at least one floor panel, and electronics channel 409A, a manual unlock lever 408A, and an aperture in the modular compartment system 449, which is operable to receive a manual unlock lever when the at least one floor panel is affixed to the modular compartment system.

FIG. 4C illustrates an enlarged internal view of electronics housing 405A of a modular compartment system according to one embodiment of the present invention. The electronics housing 405A includes a manual release pin 480. The manual release pin 480 traverses the length of the modular compartment system via a manual door panel opening mechanism and is mechanically connected to each manual open lever. Upon receiving upward pressure, the manual release pin 480 releases each of the manual open levers to manually unlock every door panel affixed to the modular compartment system. In one embodiment, an access panel of the electronics housing 405A is operable to lock and unlock. In one embodiment, the lock requires a key. In another embodiment, the lock is electronic. Since the electronics housing 405A includes a manual release pin 480 to unlock every door panel, locking the electronics housing 405A is important to prevent unwanted manual override.

Figure 4E:
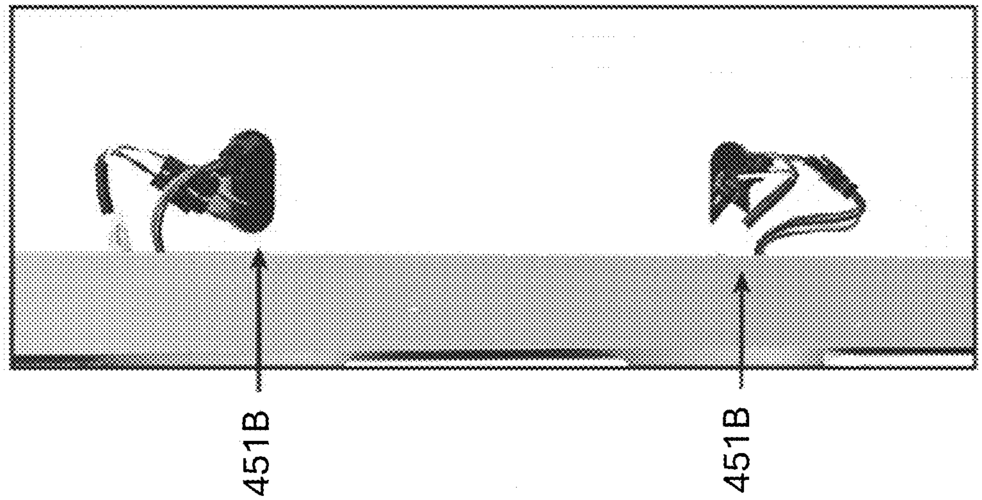
FIG. 4E illustrates an enlarged view of electrical connectivity for a floor panel of a modular compartment system according to one embodiment of the present invention.
Figure 4D:
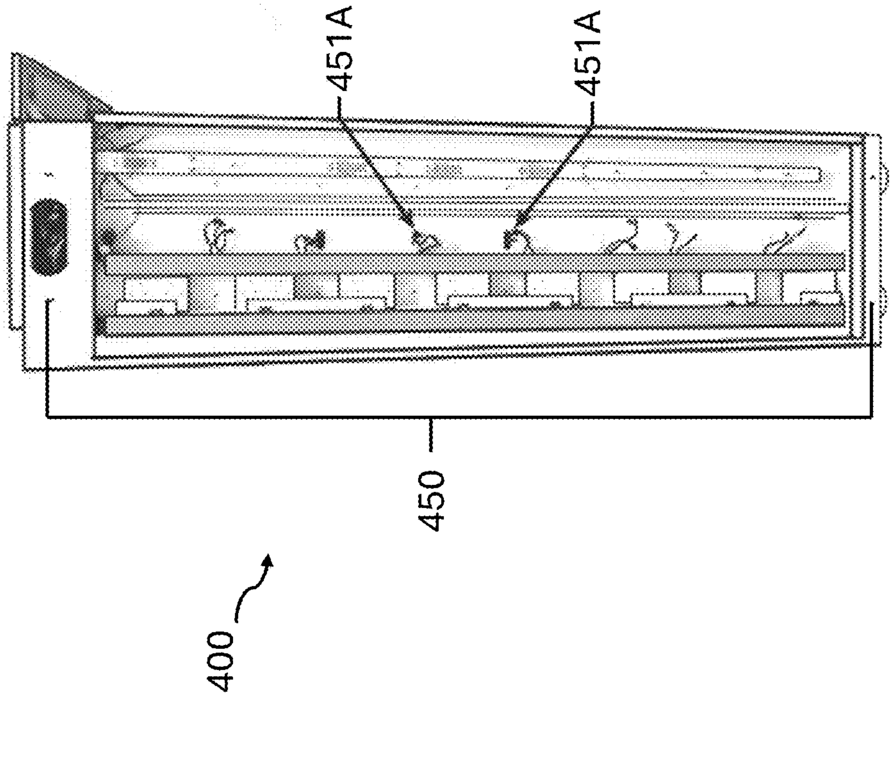
FIG. 4D illustrates an orthogonal side view of a modular compartment system according to one embodiment of the present invention.

FIG. 4D illustrates an internal orthogonal side view of a modular compartment system 400 according to one embodiment of the present invention. The modular compartment system includes a plurality of mounting and receiving elements 450 to connect the modular compartment system to another modular compartment system. In one embodiment, the plurality of mounting and receiving elements 450 of the modular compartment system 400 are operable to mate to corresponding mounting and receiving elements of another modular compartment system. The modular compartment system 400 further includes a plurality of electrical wires 451A operable to connect to at least one floor panel. Notably, the plurality of electrical wires 451A are spaced apart such that any position of the at least one floor panel is operable to receive power via one of the plurality of electrical wires 451A. FIG. 4E illustrates an enlarged view of a plurality of electrical wires 451B operable to plug into and/or receive a plug from the at least one floor panel. In one embodiment, the plurality of electrical wires 451B plug directly into the at least one floor panel. In one embodiment, the plurality of electrical wires 451B plug into an electronic lock on the at least one floor panel.

Figure 5B:
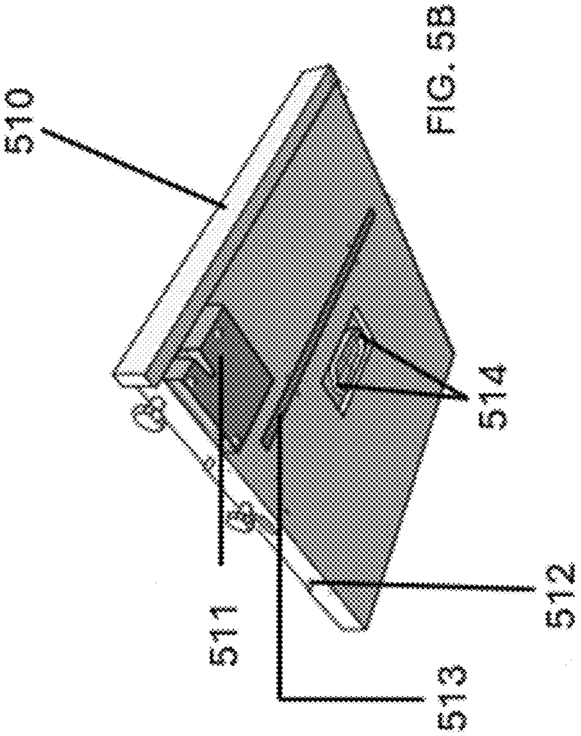
FIG. 5B illustrates a bottom perspective view from the bottom of a floor panel of a modular compartment system according to one embodiment of the present invention.
Figure 5A:
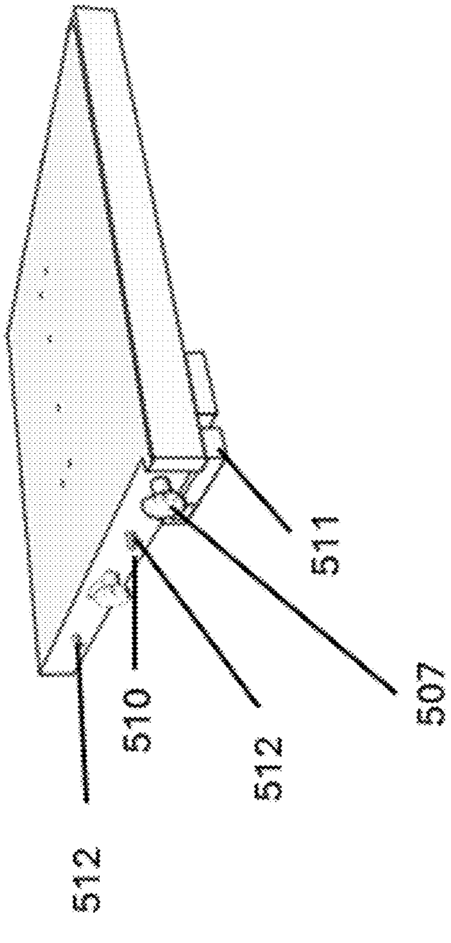
FIG. 5A illustrates a top perspective view of a floor panel of a modular compartment system according to one embodiment of the present invention.

FIG. 5A illustrates a top perspective view of a floor panel 510 of a modular compartment system according to one embodiment of the present invention. The floor panel 510 includes an electronic locking mechanism 511 operable to receive power via a plurality of electrical wires. A recessed portion of the electronic locking mechanism 511 is operable to receive a hollow protruding portion of a door panel. The electronic locking mechanism includes a movable pin that traverses the hollow protruding portion of a door panel when the electronic lock mechanism 511 is in a locked position, whereas the movable pin does not traverse the hollow protruding portion of the door panel when the electronic locking mechanism 511 is in an unlocked position, allowing the door panel to pivot freely. The floor panel 510 further includes mechanically releasable pins 512, which traverse apertures in the modular compartment system to secure the floor panel 510 within the modular compartment system, in addition to at least one fastener 507, which secures a threaded rod that similarly traverses an aperture in the modular compartment system to secure the floor panel 510.

FIG. 5B illustrates a bottom perspective view from the bottom of a floor panel 510 of a modular compartment system according to one embodiment of the present invention. The floor panel 510 includes an electronic locking mechanism 511 and a Light Emitting Diode (LED) strip 513 operable to illuminate a storage compartment. Mechanically releasable pins 512 are operable to traverse an aperture in the modular compartment system when protruding from the floor panel 510, securing the floor panel 510 within the modular compartment system. However, when release mechanism 514 receives a compressive force, the release mechanism 514 is operable to retract the mechanically releasable pins 512 from protruding from the floor panel 510 to internally house the mechanically releasable pins 512 until the compressive force on the release mechanism 514 ceases, as illustrated further in FIGS. 6A and B.

Figure 6B:
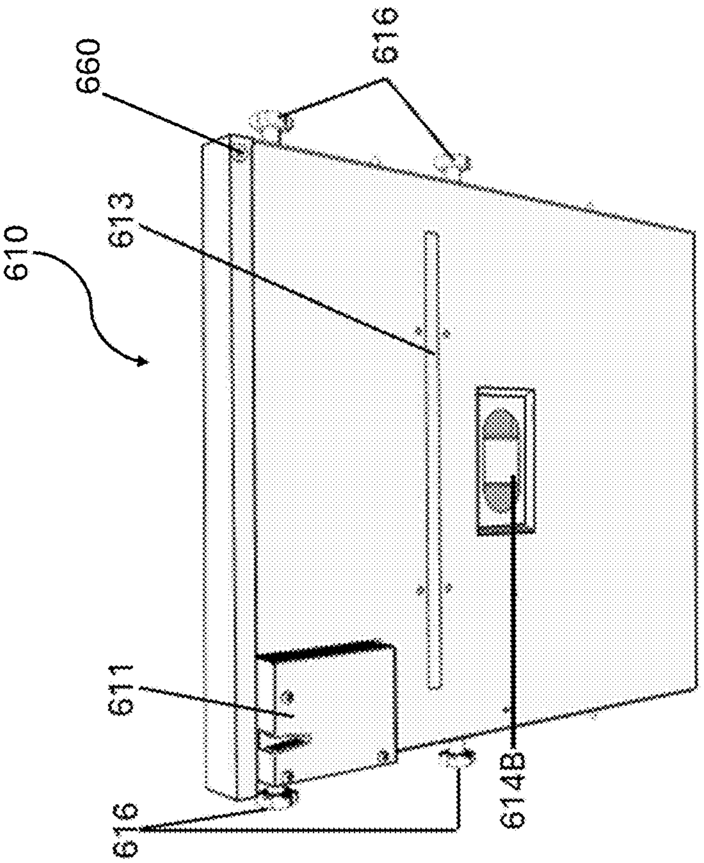
FIG. 6B illustrates an external perspective view of a floor panel of a modular compartment system according to one embodiment of the present invention.
Figure 6A:
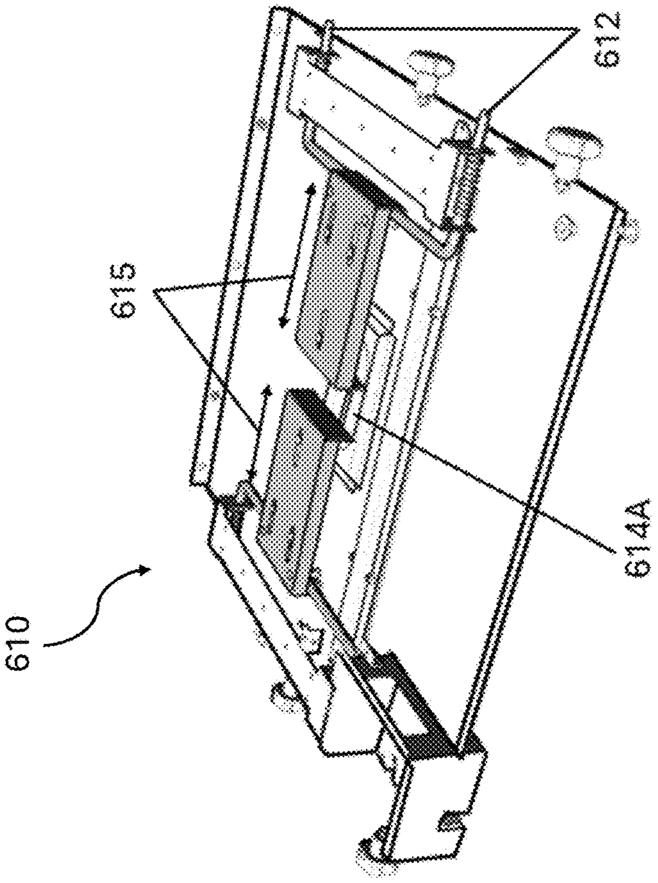
FIG. 6A illustrates an internal perspective view of a floor panel of a modular compartment system according to one embodiment of the present invention.

FIG. 6A illustrates an internal view of a floor panel 610 of a modular compartment system according to one embodiment of the present invention. The floor panel 610 includes mechanically releasable pins 612, which release when compressive force is applied to a release mechanism 614A. The release mechanism is connected to at least one sliding element 615. When compressive force is applied to the release mechanism 614A, the at least one sliding element 615 moves laterally. The lateral movement of the at least one sliding element 615 retracts the mechanically releasable pins 612 from protruding from the floor panel 610 and internally houses the mechanically releasable pins 612 until compressive force on the release mechanism 614A is terminated. In one embodiment, the mechanically releasable pins 612 include a biasing element such that when no compressive force is applied to the release mechanism 614A, tension from the biasing element forces the mechanically releasable pins 612 to protrude from the floor panel 610.

FIG. 6B illustrates an external view of a floor panel 610 of a modular compartment system according to one embodiment of the present invention. The floor panel 610 includes an electronic locking mechanism 611 operable to engage a hollow protruding portion of a door panel to lock and unlock a storage compartment. The floor panel 610 also includes an LED strip 613 to illuminate the storage compartment. Further, the floor panel 610 includes a release mechanism 614B. Fasteners 616 are used to secure the floor panel 610 to the modular compartment system when a threaded rod traverses an aperture of the modular compartment system and the fasteners 616 twist and tighten around the threaded rod to secure the floor panel 610. The floor panel 610 also includes a recession 660 operable to receive a door panel engagement pin. For example, a door panel engagement pin protrudes into the empty space created by the recession 660 such that the door panel is secure and operable to pivot around the door panel engagement pin.

Figure 7B:
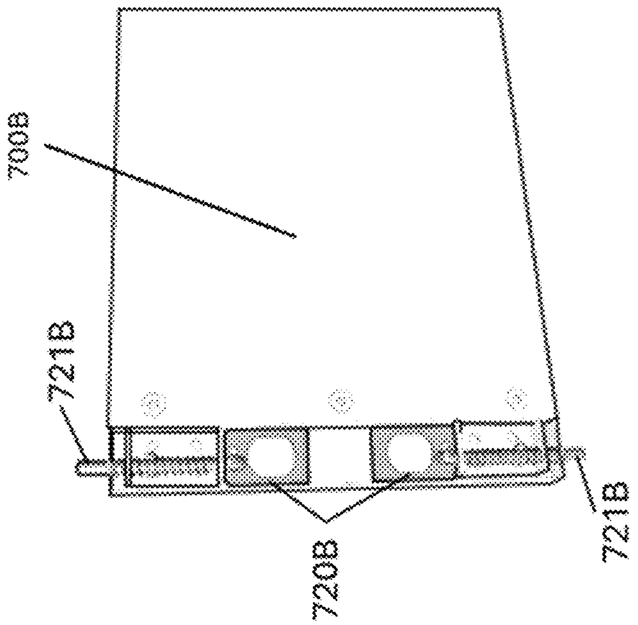
FIG. 7B illustrates an internal view of a door panel of a modular compartment system according to one embodiment of the present invention.
Figure 7A:
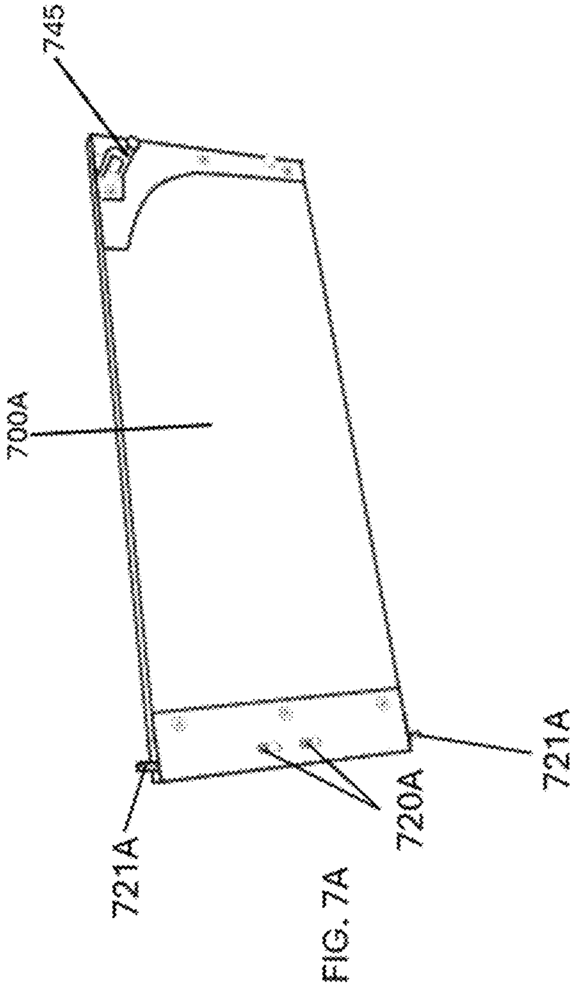
FIG. 7A illustrates a perspective view of a door panel of a modular compartment system according to one embodiment of the present invention.

FIG. 7A illustrates a perspective view of a door panel 700A of a modular compartment system according to one embodiment of the present invention. The door panel 700A is operable to pivot and engage an electronic locking mechanism on a floor panel via a hollow protruding portion 745. In one embodiment, the door panel 700A is transparent, translucent, or opaque. The door panel 700A pivots about an axis around door panel engagement pins 721A. The door panel engagement pins 721A protrude from the door panel 700A and engage a recession on a floor panel such that the door panel engagement pins 721A occupy the space created by the recession on the floor panel and enable the door panel 700A to be secure and pivot freely. A door panel release mechanism 720A is operable to receive a compressive force to retract the door panel engagement pins 721A to disengage the door panel engagement pins 712A from the recession on the floor panel to remove the door panel 700A from the modular compartment system. Notably, the door panel release mechanism 720A is on an interior surface of the door panel 700A such that the door panel release mechanism 720A inwardly faces a storage compartment when the door panel 700A is in a closed position.

FIG. 7B illustrates a perspective internal view of a door panel 700B of a modular compartment system according to one embodiment of the present invention. The door panel 700B includes the door panel release mechanism 720B. The door panel release mechanism 720B is connected to the door panel engagement pins 721B. When the door panel release mechanism 720B receives compressive force, the door panel release mechanism 720B retracts the door panel engagement pins 721B to internally house the door panel engagement pins 721B. In one embodiment, a biasing element provides tension on the door panel engagement pins 721B to maintain the door panel engagement pins 721B in a protruding state until the door panel release mechanism 720B receives compressive force. Importantly, the door panel release mechanism 720B is only accessible when the door panel 700A is unlocked (i.e., opened) because the door panel release mechanism 720B is on a side of the door panel 700A facing inward towards the storage compartment.

Figure 8:
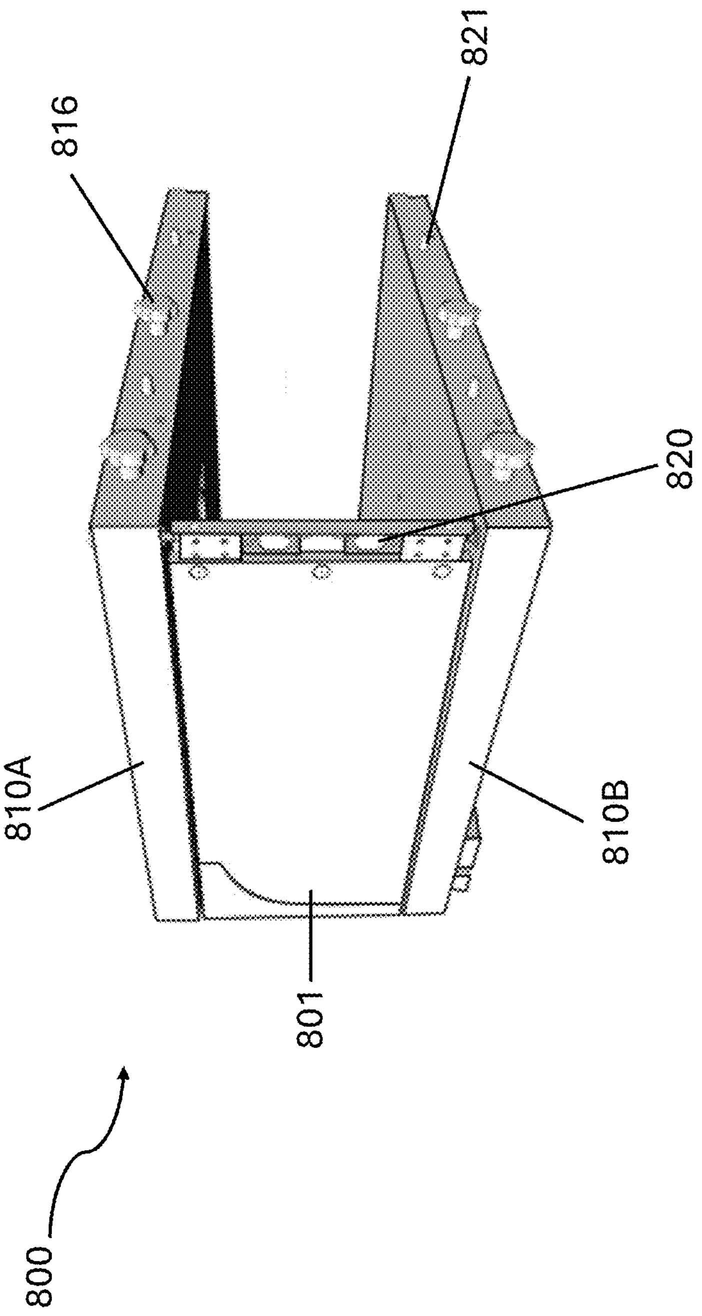
FIG. 8 illustrates a perspective view of an assembled compartment of a modular compartment system according to one embodiment of the present invention.

FIG. 8 illustrates a perspective view of an assembled compartment 800 of a modular compartment system according to one embodiment of the present invention. The assembled compartment 800 includes a first floor panel 810A engaged with a door panel 801, wherein the door panel 801 also engages a second floor panel 810B. The door panel 801 is operable to rotate about door panel engagement pins engaging the first floor panel 810A and the second floor panel 810B. The door panel engagement pins are operable to be released via a door panel release mechanism 820. To secure connection of the assembled compartment 800 to the modular compartment system, the first floor panel 810A and the second floor panel 810B utilize mechanically releasable pins 821 to traverse apertures in the modular compartment system. Further, the floor panel 810A and the second floor panel 810B include threaded rods operable to traverse apertures in the modular compartment system, wherein fasteners 816 twist along the threads while the threaded rod traverses the apertures in the modular compartment system to secure the at least one floor panel 810A and 810B to the modular compartment system. The first floor panel, 810A, and the second floor panel, 810B, secured to the modular compartment system define a storage compartment (i.e., assembled compartment 800). In one embodiment, the storage compartment requires a first floor panel and a second floor panel. In another embodiment, the storage compartment requires only one floor panel, wherein a top or bottom of the storage compartment is operable to be the top or bottom of a loading zone of the modular compartment system.

Figure 9:
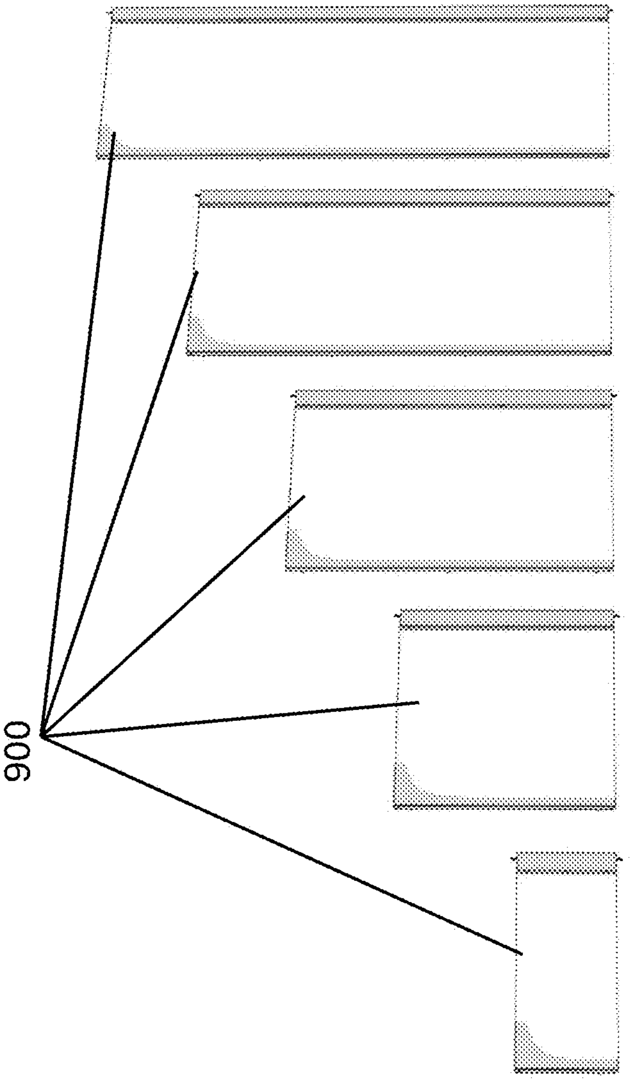
FIG. 9 illustrates front views of various sized door panels according to one embodiment of the present invention.

FIG. 9 illustrates front views of various-sized door panels 900 according to one embodiment of the present invention. The door panels 900 are operable to vary in size. Importantly, since a storage compartment of the modular compartment system is operable to be as large as a loading zone of the modular compartment system or smaller, the door panels 900 are operable to accommodate any size storage compartment. Notably, FIG. 9 displays only a representative sample of the door panel 900 sizes and is not intended to limit the door panel 900 size to what is displayed in FIG. 9.

FIG. 10A illustrates a front perspective view of a door panel 1001A with an electronic display 1002 according to one embodiment of the present invention. The display screen 1002 is operable to be a static image, video, commercial, slideshow, and/or any other digital media. In one embodiment, the display screen 1002 includes a speaker operable to project audio associated with the display screen 1002. The display screen 1002 is external to a storage compartment such that the display screen 1002 is viewable by users. In one embodiment, the display screen 1002 is operable to display an advertisement and/or sponsored product. FIG. 10B illustrates electronics for a door panel 1001B with an electronic display according to one embodiment of the present invention. The electronics for the door panel 100B are similar to a television.

User Experience

To remotely access the modular compartment system, the modular compartment system is operable to wirelessly connect to at least one network. The modular compartment system is operable to utilize a wireless personal area network (e.g., BLUETOOTH), a wireless local area network (e.g., WI-FI), a cellular network (e.g., 3G, 4G, 5G), a Long Term Evolution (LTE) system (i.e., 4G LTE), a satellite network, Ethernet, and/or any other wireless connectivity system and/or network to communicate with a mobile device. Importantly, the modular compartment system is operable to be remotely unlocked. As such, the modular compartment system is operable to transmit and receive data over at least one network. The modular compartment system includes a user portal and a renter and/or administrator portal, wherein the modular compartment system is operable to receive input from the mobile device via a plurality of interactive elements displayed on a graphical user interface (GUI) of the mobile device. In one embodiment, the modular compartment system includes a Quick Response (QR) code and/or another unique identifier code on an external surface of the modular compartment system operable to be scanned by a mobile device. Upon scanning the QR code, the modular compartment system is operable to transmit an activation signal to the mobile device to either select the user portal or the rental portal. In another embodiment, the interactive elements displayed on the graphical user interface of the mobile device of the modular compartment system are accessible via a mobile application or an internet browser without needing to scan a QR code.

Figure 11A:
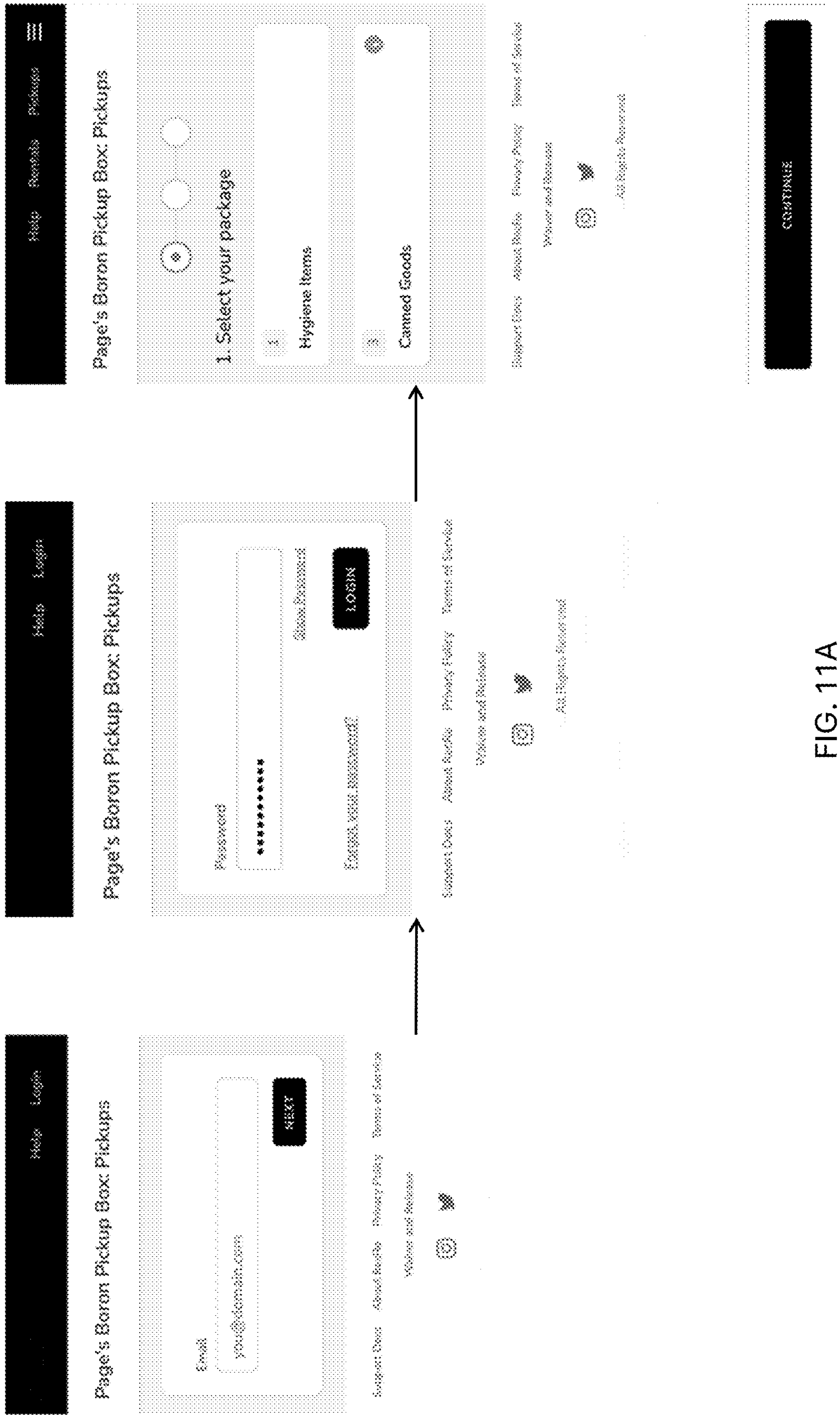
FIG. 11A illustrates a graphical user interface (GUI) for unlocking a compartment of a modular compartment system according to one embodiment of the present invention.

FIG. 11A illustrates a graphical user interface (GUI) for unlocking a storage compartment of a modular compartment system according to one embodiment of the present invention. FIG. 11A illustrates a pickup portal displayed on the GUI of a mobile device. In this embodiment, the modular compartment system is stocked by an administrator for a particular user account. For example, a student requests canned food from a university. The administrator stocks the modular compartment system with the canned food and notifies the user account that the canned food is available for pickup. In another embodiment, the modular compartment system is stocked by an administrator such that any user is able to rent an item from the modular compartment system. As such, the modular compartment system is operable to be used as a secure pickup system and/or an item rental system. Advantageously, each compartment in the modular compartment system is operable to act independently from other compartments such that a first compartment is used as a secure pickup system and a second compartment is used as a rental system. The pickup portal includes a series of prompts for a user to solicit input. The modular compartment system receives the user input before the modular compartment system unlocks the storage compartment. In one embodiment, the modular compartment system displays a prompt for a user to input identifying information (i.e., email, phone number, account name, etc.). In another embodiment, the modular compartment system is operable to include single sign-on (SSO) functionality such that a user is operable to access a plurality of applications and/or websites with a single set of credentials. In this embodiment, the modular compartment system is operable to use the SSO functionality unless the user is authenticated in a separate portal controlled by an administrator, at which point the user is then redirected back to a website application for sign on. After the modular compartment system receives the identifying information, the modular compartment system requires a password to verify the identifying information is associated with the correct user. The modular compartment system authenticates that the password is properly associated with the identifying information and displays available items within a plurality of storage compartments. In one embodiment, authentication that the password is properly associated with the identifying information includes the modular compartment system sending a verification email to a user account, which requires a user to click a link in the verification email to finalize the authentication process. In one embodiment, the modular compartment system is operable to restrict access to the modular compartment system via limiting access to the modular compartment system by email domain and/or a specific list of email addresses. In one embodiment, the modular compartment system is operable to restrict access via Comma Separated Values (CSV) files in a local database or by using an application programming interface (API) to a third-party database.

Figure 11B:
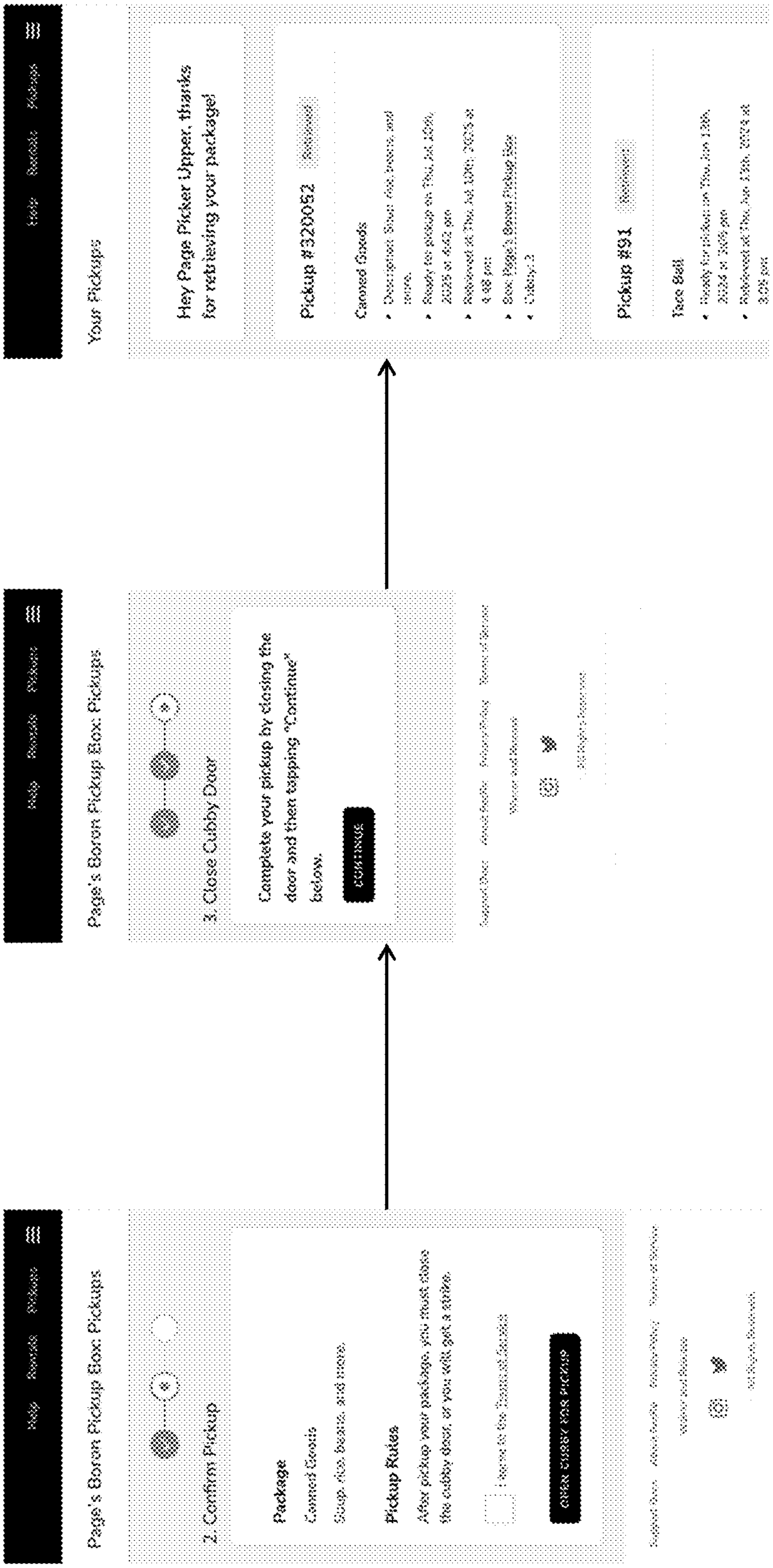
FIG. 11B illustrates a graphical user interface (GUI) for unlocking a compartment of a modular compartment system according to one embodiment of the present invention.

The modular compartment system receives the user input via selection of a GUI element corresponding to the available item and prompts the user to confirm the selected item. Referring now to FIG. 11B, optionally, in one embodiment, the modular compartment system requires acceptance of terms of use before the modular compartment system receives a selection to open the storage compartment. In one embodiment, accepting terms of use is mandatory, and use of the modular compartment system is limited only to users who have accepted the terms of use. In one embodiment, an administrator profile is operable to create terms of use for a particular modular compartment system that has been deployed and is in use. Once the modular compartment system receives confirmation to open the storage compartment, the modular compartment system receives the open command and transmits an unlocking signal to an electronic lock associated with the storage compartment housing the selected item, unlocking the storage compartment. The GUI then displays a reminder for the user to close the door panel for the storage compartment, at which point the modular compartment system automatically relocks the door panel to the storage compartment. The modular compartment system is operable to determine if the door panel is properly closed. If the modular compartment system determines that the door panel is not properly closed, the modular compartment system is operable to send a reminder to a user device via an email, text message, short message service (SMS), rich communication service (RCS), and/or any other method of transmitting a message to the user device. The GUI is operable to display a pickup receipt with details about the item, pickup time, drop-off time, storage compartment number, and identifying information for the user.

Figure 12A:
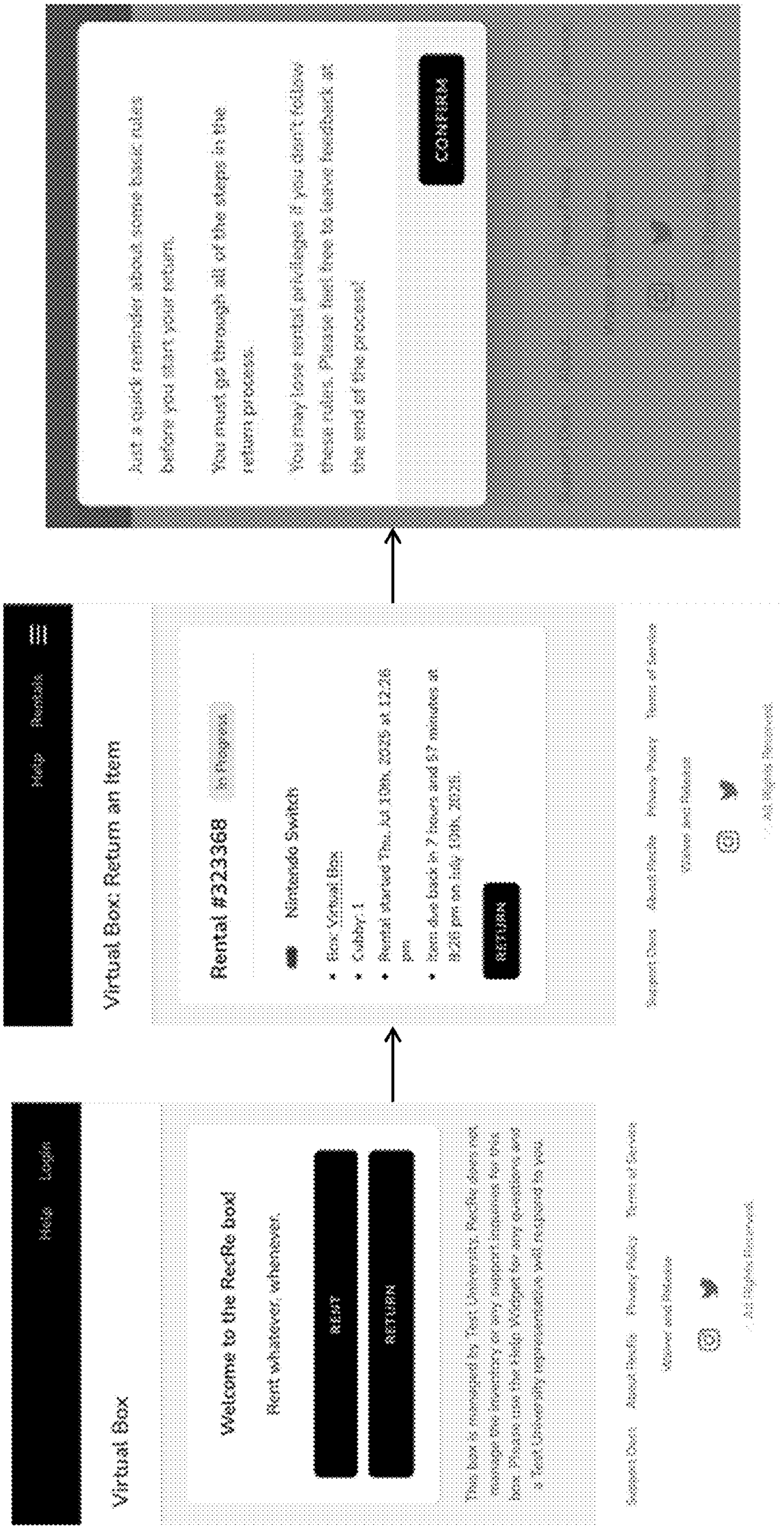
FIG. 12A illustrates a graphical user interface (GUI) for returning an item to a compartment of a modular compartment system according to one embodiment of the present invention.

FIG. 12A illustrates a graphical user interface (GUI) for returning an item to a compartment of a modular compartment system according to one embodiment of the present invention. FIG. 12A illustrates a rental portal displayed on the GUI of a mobile device according to one embodiment of the present invention. The rental portal includes a series of prompts to solicit input from a user. The modular compartment system receives the user input before the modular compartment system unlocks the storage compartment for a user to return an item into the storage compartment. The modular compartment system is operable to prompt selection of either a rent button or a return button. Upon receiving a selection of the return button, the modular compartment system is operable to automatically retrieve all outstanding rentals associated with identifying information (i.e., a user account) and display a rental receipt. In one embodiment, the return button is associated with a single modular compartment system. For example, if a user has an item rental in progress with a modular compartment system located in a student union building on a college campus and attempts to return the item to a modular compartment system located in a dormitory building, the return button will not unlock the modular compartment system located in the dormitory building. In this embodiment, the return button will only unlock the modular compartment system in the student union building because the student union building is where the item rental is currently in progress. The rental receipt includes an option to receive a selection for returning an item associated with the rental receipt. After receiving a selection of "return" displayed on the GUI, the modular compartment system receives confirmation that the user is returning an item and prompts the user to complete a series of steps to complete the return.

Figure 12B:
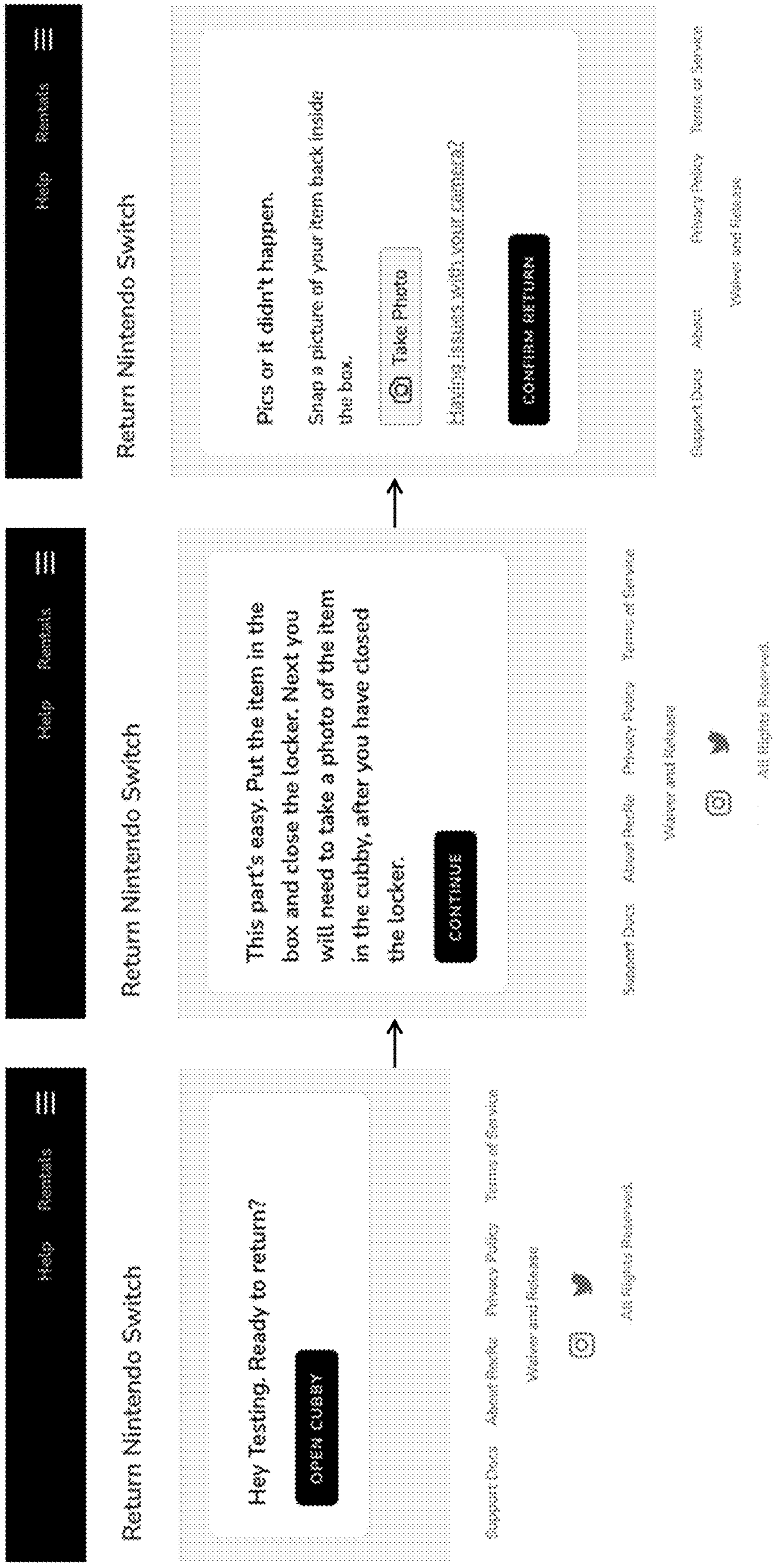
FIG. 12B illustrates a graphical user interface (GUI) for returning an item to a compartment of a modular compartment system according to one embodiment of the present invention.
Figure 12C:
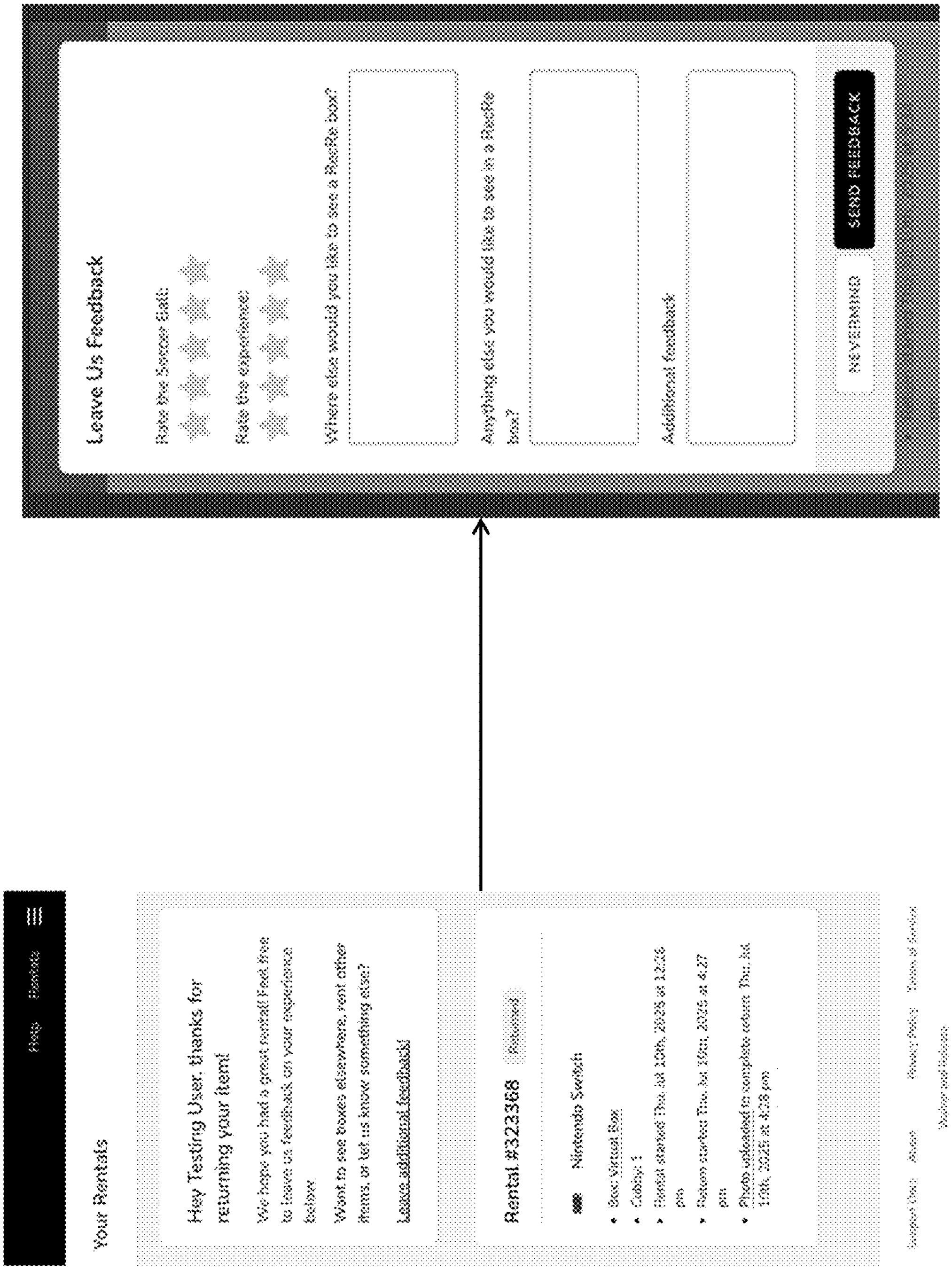
FIG. 12C illustrates a graphical user interface (GUI) for returning an item to a compartment of a modular compartment system according to one embodiment of the present invention.

Referring now to FIG. 12B, the modular compartment system receives a selection to open a storage compartment for the returned item to be placed in. A door panel to the storage compartment opens upon the modular compartment system receiving the open request from the mobile device, based on the modular compartment system transmitting an unlock request to an electronic lock on the door panel. The user places the item in the storage compartment and closes the door to the storage compartment. The modular compartment system receives confirmation that the door panel is closed. After the modular compartment system confirms that the door panel is closed, the modular compartment system prompts the user to take a photo of the item, in the proper storage compartment, with the door panel closed. In one embodiment, the modular compartment system is operable to mark a return as incomplete if the user does not close the door panel, submit a photo, and/or otherwise does not complete the return process. In this embodiment, the modular compartment system is operable to count the improper return as a strike against the user by assigning a strike to a user profile. The modular compartment system is operable to prevent access to a storage compartment by a user account receiving three strikes. However, the modular compartment system is operable to receive late returns until the storage compartment is restocked. Further, the modular compartment system is operable to remind the user to take a photo of the item and will not issue a strike against the user profile if the user takes a photo of the returned item before the item is rented by another user. In one embodiment, the modular compartment system is operable to receive the photo and utilize artificial intelligence to determine if the item is the same item that was rented, assess the condition of the item (i.e., damage, excessive wear, etc.), and verify proper return (i.e., the door panel is closed, the item is placed in the proper storage compartment, etc.). In another embodiment, the photos are manually reviewed. Referring now to FIG. 12C, the modular compartment system is operable to display a return receipt via the GUI with item details and solicit feedback on the user experience.

Generally, the modular compartment system includes LED lighting elements integrated into exterior and/or interior surfaces of each hub tower of the modular compartment system. The LED lighting elements are controlled independently for each tower and are operable to provide visual indications related to different stages of a rental and/or rental return interaction. During operation, the LEDs are operable to change color, brightness, and/or lighting pattern to guide a user through a rental and/or rental return process, highlight relevant areas of the modular compartment system, and/or communicate system status. The modular compartment system is operable to adjust the LED lighting elements in response to events. For example, in one embodiment, events include initiation of a rental, selection of a compartment, confirmation of an action, opening or closing or a door panel, and/or detection of an incomplete interaction. The responses are able to take any suitable form and are not limited to predefined animations or effects.

As an example, in one embodiment, the modular compartment system includes LED lighting elements integrated into side wall panels of each modular hub tower. The LED lighting elements are configured to display specific colors and animations that correspond to distinct stages of a rental interaction. For example, in one embodiment, in a static idle state, the LED lighting elements display either white or a designated color across each modular hub tower in the modular compartment system. When the modular compartment system receives an input indicating that a user has scanned a QR code to begin the rental interaction, the LED lighting elements transition from the static color to green in a bottom-to-top sequence, followed by a top-to-bottom return to white. When the modular compartment system receives a selection from a user device, a green highlight beam, matching the vertical position of the selected storage compartment, animates on the associated modular hub tower and exhibits a breathing effect to draw attention. Upon rental confirmation and door panel release, the highlight expands and transitions to blue, then re-centers on the selected storage compartment while surrounding LED lighting elements return to the static color. When the door panel is closed, the blue highlight expands fully, shifts to green, and then transitions to white in a top-down cascade, indicating completion of the rental interaction. If the door panel remains open beyond a set time, such as 30 seconds, the storage compartment highlights change to red with a pulsing effect until the door panel is properly closed, at which point the LED sequence resumes and returns to the static state.

In this embodiment, the coordinated LED lights are firmware-controlled and compartment-specific. The modular compartment system is operable to include the coordinated LED lights as part of a live user feedback loop.

Figure 13:
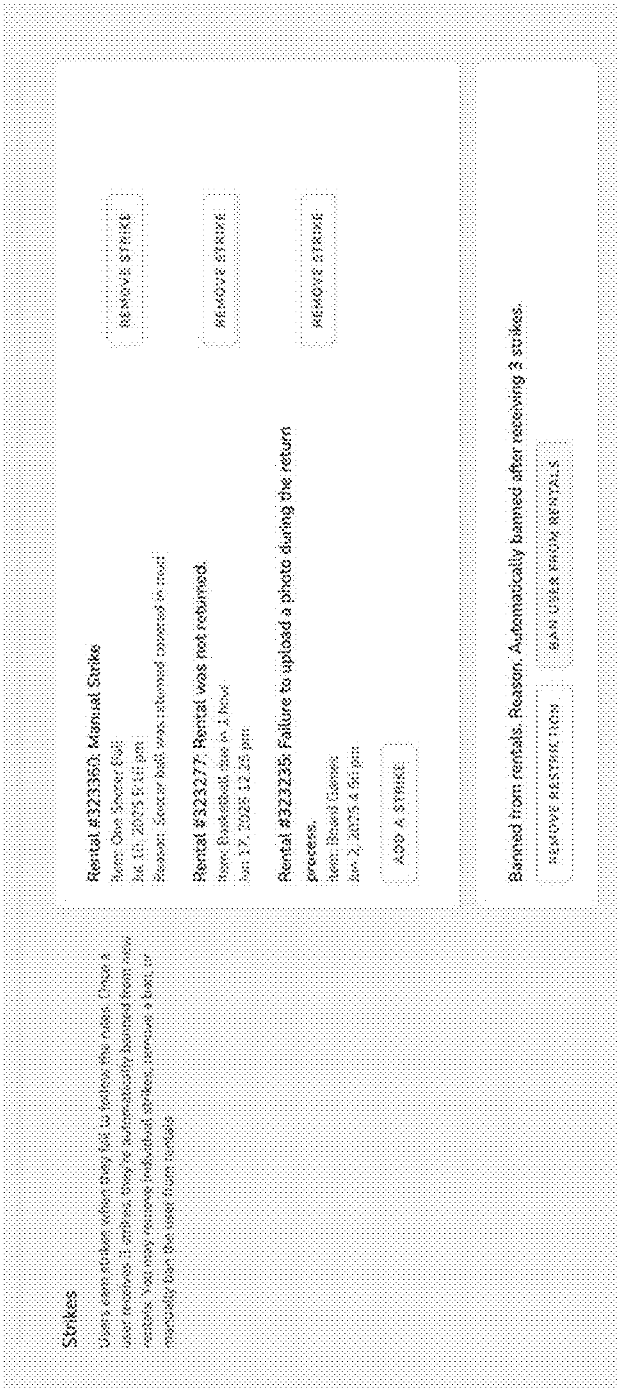
FIG. 13 illustrates a graphical user interface (GUI) for a strike system according to one embodiment of the present invention.

FIG. 13 illustrates a graphical user interface (GUI) for a strike system according to one embodiment of the present invention. In one embodiment, the modular compartment system is operable to include a strike system such that each time a user fails to properly check out (i.e., leaves the door panel open, fails to submit a photo of the item after the door panel is closed) or fails to properly return an item (i.e., fails to return the item on time, leaves the door panel open after return, returns a damaged item, etc.), the modular compartment system adds a strike to the identifying information associated with a user (i.e., email, phone number, etc.). After a user receives three strikes, the modular compartment system is operable to prevent the user from accessing the modular compartment system. The strike system enables accountability for users and prevents theft or abuse of the modular compartment system. In one embodiment, the modular compartment system includes an administrator account including an option to restock items deemed to have not been returned properly. In one embodiment, the administrator account includes an option to verify that an item has not been returned before restocking a storage compartment.

Figure 14:
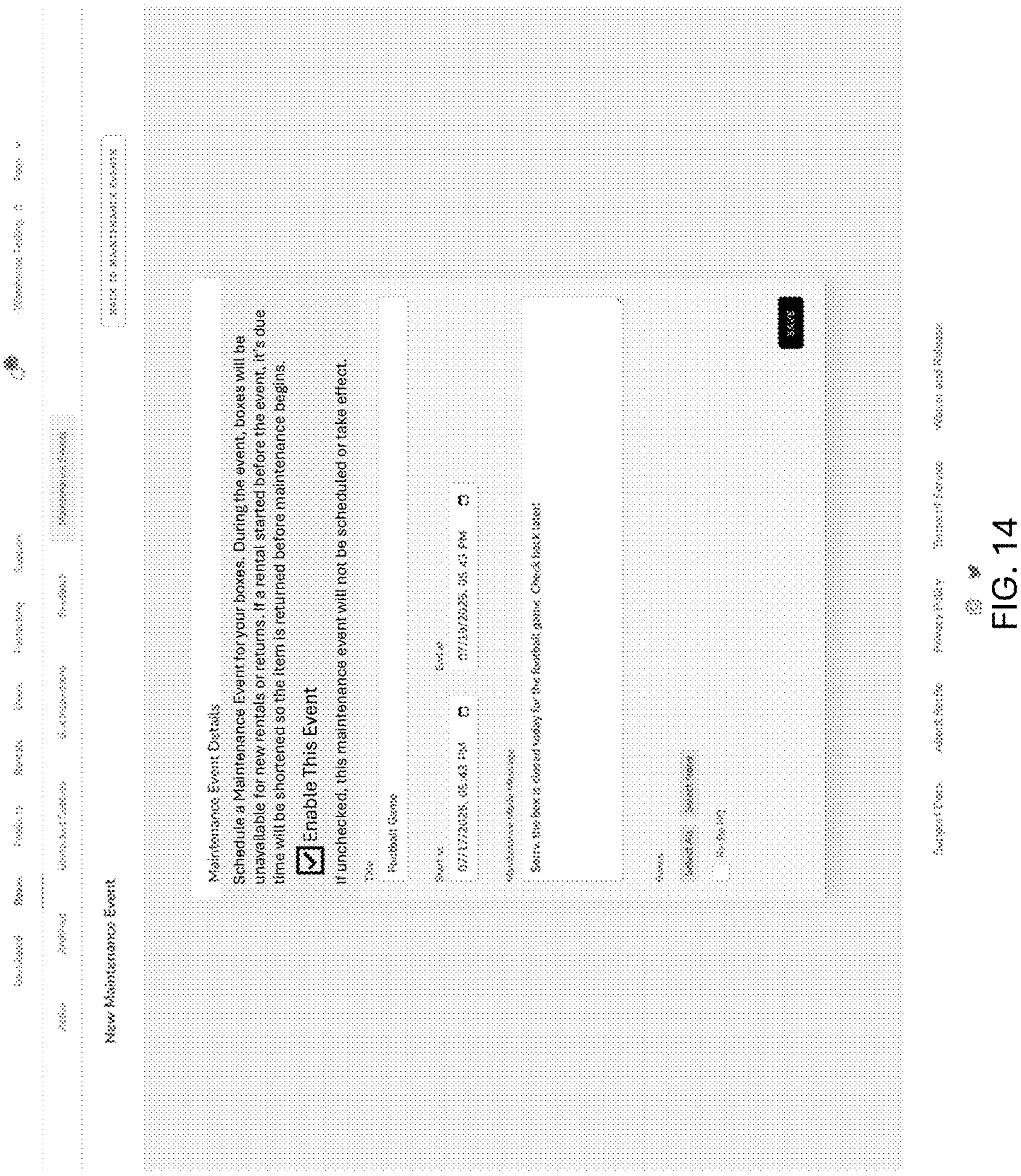
FIG. 14 illustrates a graphical user interface (GUI) for a scheduled maintenance event according to one embodiment of the present invention.

FIG. 14 illustrates a graphical user interface (GUI) for a scheduled maintenance event according to one embodiment of the present invention. In one embodiment, the scheduled maintenance event includes a modular compartment system automatically preventing unlocking of all storage compartments to prevent any users from renting an item (i.e., accessing a storage compartment). For example, the scheduled maintenance event includes an administrator preventing the modular compartment system from being used for a certain period of time. The modular compartment system is operable to receive a request for a maintenance event via the GUI, at which point the modular compartment system will automatically engage the scheduled maintenance event until the scheduled maintenance event expires or an administrator manually deactivates the scheduled maintenance event. In one embodiment, the administrator is operable to set time restrictions for the modular compartment system such that users are only operable to access storage compartments of the modular compartment system between, for example, 8:00 AM-5:00 PM. In this embodiment, users are able to initiate rentals only within permitted time windows, and returns must be completed within the permitted time windows.

Figure 15:
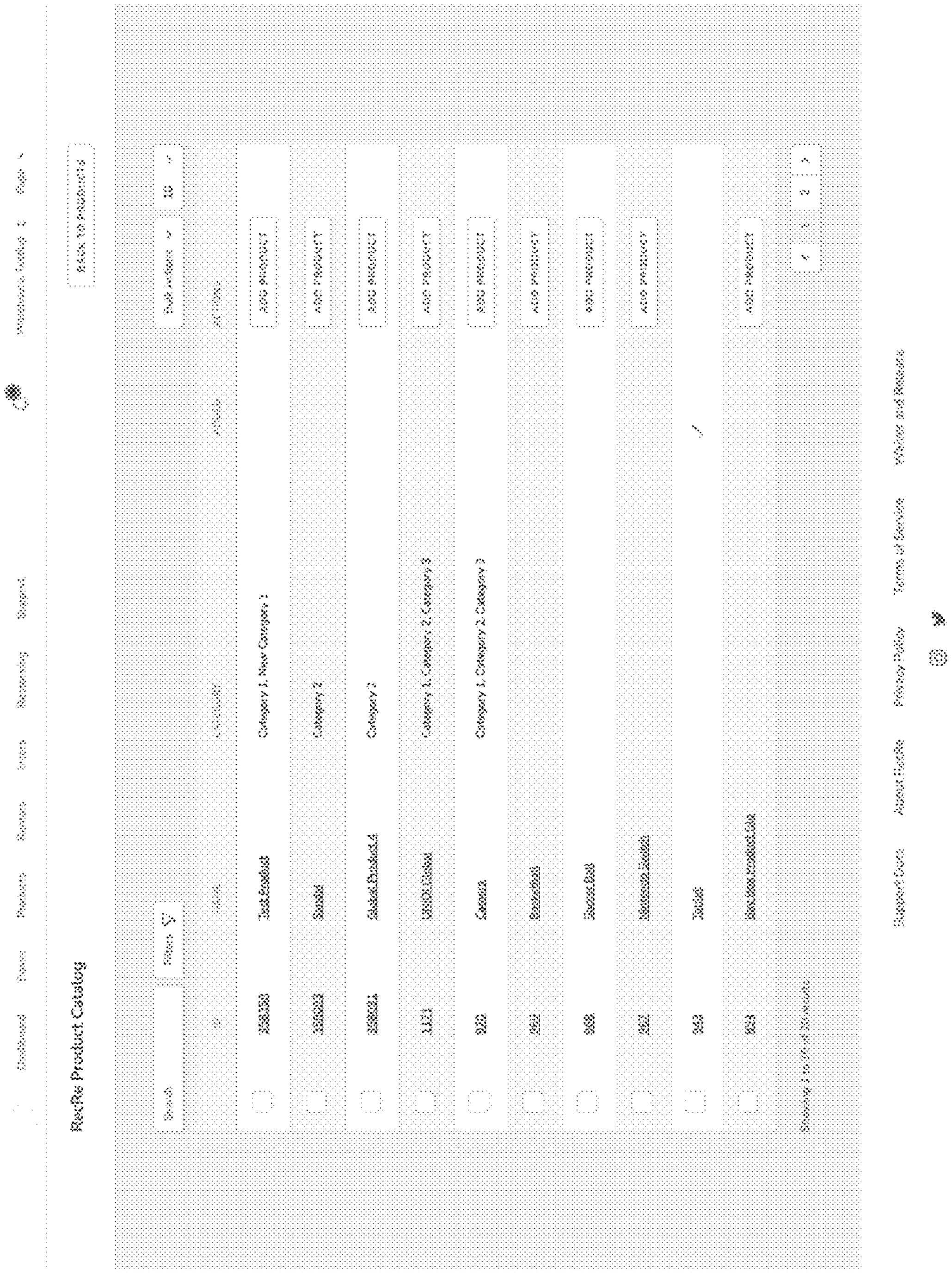
FIG. 15 illustrates a graphical user interface (GUI) for a product catalog according to one embodiment of the present invention.

FIG. 15 illustrates a graphical user interface (GUI) for a product catalog according to one embodiment of the present invention. The product catalog is displayed via the GUI and includes a product identification, a product name, a product category, whether the product has been added to a storage compartment, and an option to add the product to a storage compartment. Advantageously, this enables an administrator to manage products within a modular compartment system without manually checking each storage compartment.

In one embodiment, the modular compartment system is operable to include embedded cameras in the modular compartment system such that any storage compartment configuration includes at least one embedded camera viewing each storage compartment. The embedded camera is operable to capture video, image, and audio data. The modular compartment system is operable to include artificial intelligence to monitor each storage compartment and confirm the presence of an item in the storage compartment, the condition of an item, confirm rental and return time, and/or conduct any other necessary analysis on the video, image, and/or audio data.

In one embodiment, the modular compartment system is operable to include a plurality of items in a storage compartment. For example, the storage compartment is operable to store a plurality of books. The modular compartment system is operable to catalog the plurality of books and enable a user to select which of the plurality of books the user wants to rent from the storage compartment without renting all of the plurality of books.

In one embodiment, the modular compartment system is operable to require manual inspection of a storage compartment after a predetermined number of rentals for the storage compartment are complete. For example, after an item in the storage compartment has been rented five times, the modular compartment system prevents another rental for the item until an administrator has inspected the item and the storage compartment to confirm the item is in good condition. For example, if the item is a vacuum cleaner, the administrator is notified of the requirement for manual inspection upon return of the vacuum cleaner, at which point the administrator will inspect the vacuum cleaner and ensure that the vacuum cleaner is not clogged and/or dirty before enabling another user to rent the vacuum cleaner from the storage compartment.

In one embodiment, the modular compartment system is operable to require payment to access a storage compartment. In another embodiment, the modular compartment system is operable to not require payment to access a storage compartment.

In one embodiment, the modular compartment system includes tethered lockable modular towers or satellite locking units configured to secure larger or irregularly shaped items that do not fit within standard compartments. The tethered lockable modular towers are operable to employ electronically controlled cables, bars, and/or other locking mechanisms. Further, the tethered lockable modular towers are operable to be used as extensions of a hub tower through wired and/or wireless communication. The tethered lockable modular towers are operable to be controlled by the same processing system as the other components within the modular compartment system, enabling the tethered lockable modular towers to participate in the same rental and return workflows and include optional visual indicators or manual overrides consistent with systems and methods described herein.

In one embodiment, the modular compartment system includes cameras, sensors, and/or any other image-capturing devices within compartments and/or tethered lock towers. The image-capturing devices are operable to record images and/or video during rental and return events. In one embodiment, the images and/or videos are analyzed automatically using computer vision, pattern recognition, and/or machine learning models to verify that a correct item has been returned, to detect damage or improper use, and/or to support automated audit and inventory functions. The modular compartment system is operable to use the automated determinations to adjust rental status, alert administrators, and/or initiate follow-up actions without manual review.

In one embodiment, the modular compartment system is operable to automatically analyze return images received and/or captured by the modular compartment system using artificial intelligence. For example, when an item is returned, the modular compartment system is operable to provide real-time feedback to a user based on detecting missing and/or inaccurate information from the return image (i.e., the storage compartment is not present, the return is at the wrong modular hub tower), an item is missing from the storage compartment, the wrong item is in the storage compartment, and/or the item is in the wrong storage compartment.

In one embodiment, the modular compartment system is operable to provide access to at least one storage compartment in exchange for at least one user device playing sponsorship related content before and/or after a rental and/or the modular compartment system transmitting sponsorship-related content to the at least one user device before and/or after a rental.

In one embodiment, the modular compartment system is operable to receive a reservation for an item ahead of a rental and/or pickup time. For example, the modular compartment system is operable to receive a reservation request for an item before a user is physically present to rent the item such that the modular compartment system will prevent any other users from renting the item during the reservation time and further prevent the reserving user from accessing the item before the reservation time.

In one embodiment, the modular compartment system includes associated software for inventory management outside of a storage compartment. For example, the software is installed on a computer such that administrators are able to manage and track inventory stored somewhere other than the storage compartment (i.e., behind a desk of a recreational center). The software enables inventory management for items that are too large for the storage compartment. The software enables a user to reserve an item ahead of time and check out the item after receiving administrator approval. The modular compartment system requires a user to scan a QR code and go through the same identification verification process as is required for storage compartment access before the administrator rents the item to the user. In one embodiment, the software does not require a reservation and enables a user to rent an item in person. The software is operable to receive administrator input as to which user rented the item and when the item is to be returned and to verify that the item was returned on time during the return process. Therefore, a user is able to select an option via a GUI on a user device, and the modular compartment system receives the selection as to whether the user wants to rent an item from an administrator or a storage compartment. Advantageously, the software includes the same functionality as previously described herein (i.e., strike system, etc.).

In one embodiment, the modular compartment system includes the ability to authenticate a user via a radio frequency identification (RFID) reader on the modular compartment system. For example, the modular compartment system is operable to receive an identification badge (i.e., student campus card) or mobile device via the RFID reader. The modular compartment system is operable to verify the user before the rental process begins. In this embodiment, verification of the user includes the modular compartment system transmitting the identity of the user to a web application, wherein the web application verifies the identity of the user based on the identification badge or mobile device.

In one embodiment, the modular compartment system is operable to include artificial intelligence operable to analyze the overall rental data for the modular compartment system. For example, the modular compartment system is operable to utilize AI to provide administrators recommendations for which products/items are most popular. In one embodiment, the AI is operable to determine which items are most popular based on season, time of day, and/or overall popularity based on the number of rentals for a particular item.

In one embodiment, the modular compartment system is operable to include simultaneous access to a returnable item and a non-returnable item in the same or separate storage compartments. For example, a user selects a rental for an item in storage compartment 1, such as a basketball. When the modular compartment system grants the user access to storage compartment 1, the modular compartment system is operable to also grant the user access to storage compartment 2, wherein storage compartment 2 includes a wet wipe for the user to clean the basketball before using it. In this embodiment, the basketball must be returned, but the wet wipe can be discarded. In another embodiment, the storage compartment 1 includes both the basketball and the wet wipe, wherein only the basketball is returnable.

Figure 16:
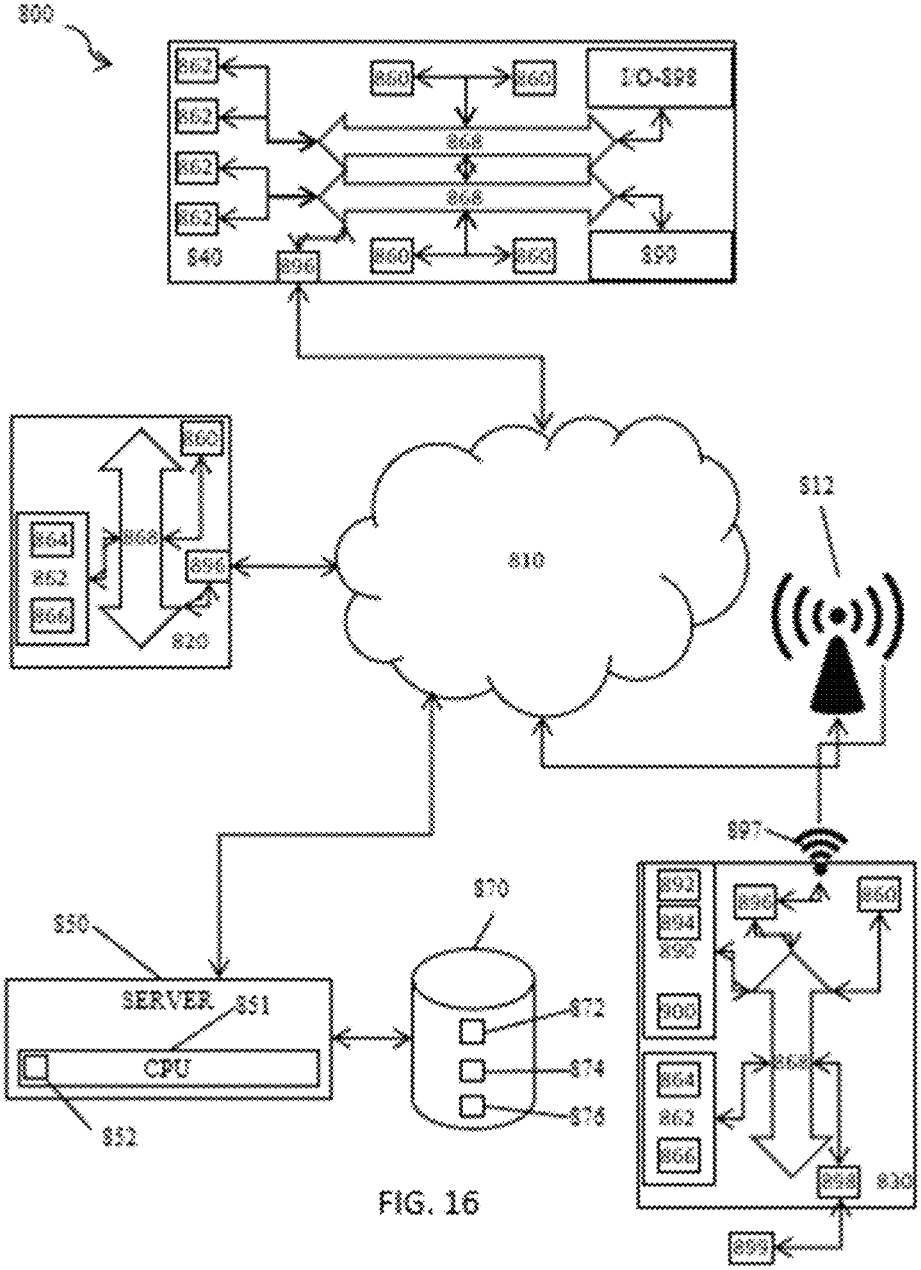
FIG. 16 illustrates a schematic diagram according to one embodiment of the present invention.

FIG. 16 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device or integrated into another entity or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions are meant to be exemplary only and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 16, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

It is also contemplated that the computer system 800 is operable to not include all of the components shown in FIG. 16, is operable to include other components that are not explicitly shown in FIG. 16, or is operable to utilize an architecture completely different than that shown in FIG. 16. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A modular compartment system, comprising:
a hub tower including control electronics;
a plurality of floor panels each including at least one engagement element;
a plurality of door panels;
a manual release pin; and
a plurality of electronic locking mechanisms for the plurality of door panels;
wherein the hub tower includes a plurality of receiving elements, each of the plurality of receiving elements are operable to receive the at least one engagement element, securing the plurality of floor panels to the hub tower;
wherein the at least one engagement element include a biasing element operable to apply force to the at least one engagement element such that at least one engagement element protrudes from the plurality of floor panels to engage the plurality of receiving elements;
wherein securing the plurality of floor panels to the hub tower creates a plurality of compartments;
wherein the plurality of door panels are operable to engage the plurality of floor panels and/or the hub tower via a pivotal engagement;
wherein the plurality of door panels are operable to engage the plurality of electronic locking mechanisms when the plurality of electronic locking mechanisms are in a locked position and disengage the plurality of electronic locking mechanisms when the plurality of electronic locking mechanisms are in an unlocked position;
wherein the manual release pin is operable to mechanically override the plurality of electronic locking mechanisms;
wherein the mechanical override includes disengaging the plurality of electronic locking mechanisms from each of the plurality of door panels; and
wherein sizes of the plurality of compartments are adjustable via repositioning the plurality of floor panels within the hub tower.

2. The modular compartment system of claim 1, wherein the control electronics are operable to lock and unlock the plurality of electronic locking mechanisms upon receiving a request from a user device to lock or unlock the plurality of electronic locking mechanisms.

3. The modular compartment system of claim 2, wherein the control electronics are operable to restrict access to the plurality of compartments for a user account associated with the user device if the user account has engaged in three or more improper actions.

4. The modular compartment system of claim 3, wherein the user account is verified before the control electronics are operable to receive the request from the user device.

5. The modular compartment system of claim 2, wherein the modular compartment system is operable to display rental options for the plurality of compartments via a graphical user interface (GUI) of the user device.

6. The modular compartment system of claim 5, wherein the GUI is operable to display information about the plurality of compartments, an item, the compartment rental and/or return details, and/or a rental and/or return receipt.

* * * * *